United States Patent
Hampel et al.

(10) Patent No.: US 11,265,754 B2
(45) Date of Patent: Mar. 1, 2022

(54) BEARER MAPPING ON WIRELESS BACKHAUL USING CELLULAR RADIO ACCESS TECHNOLOGIES

(71) Applicant: QUALCOMM Incorporated, San Diego, CA (US)

(72) Inventors: Karl Georg Hampel, Hoboken, NJ (US); Junyi Li, Chester, NJ (US); Tao Luo, San Diego, CA (US); Navid Abedini, Somerset, NJ (US); Muhammad Nazmul Islam, Littleton, MA (US); Hong Cheng, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/654,534

(22) Filed: Oct. 16, 2019

(65) Prior Publication Data
US 2020/0137614 A1 Apr. 30, 2020

Related U.S. Application Data

(60) Provisional application No. 62/750,815, filed on Oct. 25, 2018.

(51) Int. Cl.
*H04W 28/02* (2009.01)
*H04W 76/11* (2018.01)
*H04W 80/02* (2009.01)

(52) U.S. Cl.
CPC ... *H04W 28/0263* (2013.01); *H04W 28/0268* (2013.01); *H04W 76/11* (2018.02); *H04W 80/02* (2013.01)

(58) Field of Classification Search
CPC ........ H04W 28/0263; H04W 28/0268; H04W 76/11; H04W 80/02
USPC ........................................................ 370/229
See application file for complete search history.

(56) References Cited

PUBLICATIONS

R2-1815516, "Comparison between Bearer Mapping Solutions", 3GPP TSG-RAN WG2 Meeting #103bis (Year: 2018).*
TR_38874_v040_-cl, "3GPP TR 38.874 V0.4.0 (Aug. 2018)" (Year: 2018).*
R2-1815520, "IAB bearer mapping decisions", 3GPP TSG-RAN WG2#103bis (Year: 2018).*

(Continued)

*Primary Examiner* — Yemane Mesfin
*Assistant Examiner* — Intekhaab A Siddiquee
(74) *Attorney, Agent, or Firm* — Danai Nelisile Mhembere; Holland & Hart LLP

(57) ABSTRACT

Methods, systems, and devices for wireless communications are described. A transmitting device may identify a first channel group comprising a first radio bearer and a second channel group comprising a set of second radio bearers. In some examples, the first channel group further comprising a one-to-one mapping between the first radio bearer and a first channel of a backhaul network and the second channel group comprising a many-to-one mapping between the set of second radio bearers and a second channel of the backhaul network. The transmitting device may transmit a first packet on the first channel of the first channel group of the backhaul network, the first packet comprising a mapping indicator set to a first value and a first identifier associated with the first channel of the first channel group.

38 Claims, 14 Drawing Sheets

(56) References Cited

PUBLICATIONS

International Search Report and Written Opinion—PCT/US2019/056721—ISA/EPO—dated Jan. 21, 2020.

LG Electronics Inc: "Bearer Mapping in IAB Node", 3GPP Draft; R2-1810871_Bearer Mapping in IAB Node_V5, 3rd Generation Partnership Project (3GPP), Mobile Competence Centre; 650, Route Des Lucioles; F-06921 Sophia-Antipolis Cedex; France, vol. RAN WG2, No. Montreal, Canada; Jul. 2, 2018-Jul. 6, 2018 Jul. 8, 2018, XP051526590, Retrieved from the Internet: URL:http://www.3gpp.org/ftp/tsg%5Fran/WG2%5FRL2/TSGR2%5FAHs/2018%5F07%5FNR/Do cs/R2%2D1810871%2Ezip [retrieved on Jul. 8, 2018], figure 5, 6 pages.

Qualcomm Inc: "Comparison of Bearer Mapping Options in IAB Arch Group 1", 3GPP Draft; R2-1814070—Comparison of Bearer Mapping Options in IAB Arch 1A, 3rd Generation Partnership Project (3GPP), Mobile Competence Centre; 650, Route Des Lucioles; F-06921 Sophia-Antipolis Cedex; France, vol. Ran WG2, No. Chengdu, China; Oct. 8, 2018-Oct. 12, 2018 Sep. 26, 2018, XP051523532, Retrieved from the Internet: URL:http://www.3gpp.org/ftp/tsg%5Fran/WG2%5FRL2/TSGR2%5F103bis/Docs/R2%2D1814070%2Ezip [retrieved on Sep. 26, 2018], section 2, 3 pages.

Qualcomm Inc (Rapporteur): "Email Discussion on Unified Design for IAB Arch 1a", 3GPP Draft; R2-1815960 IAB-ARCH-1A Unfied Design, 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018, Oct. 12, 2018, XP051525154, Retrieved from the Internet: URL:http://www.3gpp.org/ftp/tsg%5Fran/WG2%5FRL2/TSGR2%5F103bis/Docs/R2%2D1815960%2Ezip [retrieved on Oct. 12, 2018], section 1, section 2.2, 14 pages.

VIVO: "Comparison between Bearer Mapping Solutions", 3GPP Draft; R2-1815516, 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018 Sep. 28, 2018, XP051524836, Retrieved from the Internet: URL:http://www.3gpp.org/ftp/tsg%5Fran/WG2%5FRL2/TSGR2%5F103bis/Docs/R2%2D1815516%2Ezip [retrieved on Sep. 28, 2018], 5 pages.

* cited by examiner

BEARER MAPPING ON WIRELESS BACKHAUL USING CELLULAR RADIO ACCESS TECHNOLOGIES

CROSS REFERENCE

The present Application for Patent claims the benefit of U.S. Provisional Patent Application No. 62/750,815 by HAMPEL, et al., entitled "BEARER MAPPING ON WIRELESS BACKHAUL USING CELLULAR RADIO ACCESS TECHNOLOGIES," filed Oct. 25, 2018, assigned to the assignee hereof, and expressly incorporated herein.

INTRODUCTION

The following relates generally to wireless communications, and more specifically to radio bearer mapping in a backhaul network of a wireless communication system.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a device (e.g., a transmitting device) is described. The method may include identifying a first channel group including a first radio bearer and a second channel group including a set of second radio bearers. The method may further include transmitting a first packet on the first channel of the first channel group of the backhaul network. The first packet may include a mapping indicator set to a first value and a first identifier associated with the first channel of the first channel group. The method may further include transmitting a second packet on the first channel of the second channel group of the backhaul network. The second packet may include the mapping indicator set to a second value different from the first value and a second identifier associated with the first channel of the second channel group.

An apparatus for wireless communications at a device (e.g., a transmitting device) is described. The apparatus may include a processor and memory coupled to processor. The processor and memory configured to identify a first channel group including a first radio bearer and a second channel group including a set of second radio bearers, transmit a first packet on the first channel of the first channel group of the backhaul network, the first packet including a mapping indicator set to a first value and a first identifier associated with the first channel of the first channel group, and transmit a second packet on the first channel of the second channel group of the backhaul network, the second packet including the mapping indicator set to a second value different from the first value and a second identifier associated with the first channel of the second channel group.

Another apparatus for wireless communications at a device (e.g., a transmitting device) is described. The apparatus may include means for identifying a first channel group including a first radio bearer and a second channel group including a set of second radio bearers, transmitting a first packet on the first channel of the first channel group of the backhaul network, the first packet including a mapping indicator set to a first value and a first identifier associated with the first channel of the first channel group, and transmitting a second packet on the first channel of the second channel group of the backhaul network, the second packet including the mapping indicator set to a second value different from the first value and a second identifier associated with the first channel of the second channel group.

A non-transitory computer-readable medium storing code for wireless communications at a device (e.g., a transmitting device) is described. The code may include instructions executable by a processor to identify a first channel group including a first radio bearer and a second channel group including a set of second radio bearers, transmit a first packet on the first channel of the first channel group of the backhaul network, the first packet including a mapping indicator set to a first value and a first identifier associated with the first channel of the first channel group, and transmit a second packet on the first channel of the second channel group of the backhaul network, the second packet including the mapping indicator set to a second value different from the first value and a second identifier associated with the first channel of the second channel group.

In some examples of the method, apparatuses, and non-transitory computer-readable medium described herein, the first channel group further including a 1:1 mapping between the first radio bearer and a first channel of a backhaul network and the second channel group including a M:1 mapping between the set of second radio bearers and a second channel of the backhaul network.

Some examples of the method, apparatuses, and non-transitory computer-readable medium described herein may further include operations, features, means, or instructions for selecting a first link of the backhaul network for transmitting the first packet based on a first radio bearer identifier associated with the first packet, and selecting said first link of the backhaul network for transmitting the second packet based on a destination address associated with the second packet.

Some examples of the method, apparatuses, and non-transitory computer-readable medium described herein may further include operations, features, means, or instructions for receiving a signal configuring a channel group, the signal indicating whether the channel group may be the first channel group or the second channel group and including a channel group identifier for the channel group.

In some examples of the method, apparatuses, and non-transitory computer-readable medium described herein, the signal configures the first radio bearer to be part of the first channel group and configures the set of second radio bearers to be part of the second channel group.

Some examples of the method, apparatuses, and non-transitory computer-readable medium described herein may further include operations, features, means, or instructions for receiving a third packet including the mapping indicator, a third identifier, a radio bearer identifier and a destination address, determining, based on the mapping indicator, whether the third packet belongs to the first channel group or the second channel group, selecting a backhaul link for transmission based on whether the third identifier of the third packet belongs to the first channel group or the destination address of the third packet belongs to the second channel group, and selecting a channel for transmission on the selected backhaul link based on the third identifier.

In some examples of the method, apparatuses, and non-transitory computer-readable medium described herein, the mapping indicator may include operations, features, means, or instructions for a control bit, or a logical channel identifier, or a combination thereof.

In some examples of the method, apparatuses, and non-transitory computer-readable medium described herein, the first identifier includes a user equipment radio bearer identifier and the second identifier includes a logical channel identifier.

In some examples of the method, apparatuses, and non-transitory computer-readable medium described herein, the mapping indicator, the first identifier, the second identifier, or a combination thereof, may be indicated in a packet header of the corresponding packet.

In some examples of the method, apparatuses, and non-transitory computer-readable medium described herein, the packet header may include operations, features, means, or instructions for a MAC sub-header, a MAC sub-header extension, an extension header, a RLC header, an adaption layer header, a General-Packet-Radio-Service-Tunneling-Protocol header, or a combination thereof.

A method of wireless communications at a device (e.g., a receiving device) is described. The method may include receiving a packet associated with a channel group from a set of available channel groups, the set of available channel groups including a first channel group that includes a first radio bearer and a second channel group that includes a set of second radio bearers, determining, based on a mapping indicator indicated in the packet, whether the packet belongs to the first channel group or the second channel group, and identifying, based on the determined channel group and an identifier indicated in the packet, a radio link channel entity associated with the packet.

An apparatus for wireless communications at a device (e.g., a receiving device) is described. The apparatus may include a processor. The processor and memory configured to receive a packet associated with a channel group from a set of available channel groups, the set of available channel groups including a first channel group that includes a first radio bearer and a second channel group that includes a set of second radio bearers, determine, based on a mapping indicator indicated in the packet, whether the packet belongs to the first channel group or the second channel group, and identify, based on the determined channel group and an identifier indicated in the packet, a radio link channel entity associated with the packet.

Another apparatus for wireless communications at a device (e.g., a receiving device) is described. The apparatus may include means for receiving a packet associated with a channel group from a set of available channel groups, the set of available channel groups including a first channel group that includes a first radio bearer and a second channel group that includes a set of second radio bearers, determining, based on a mapping indicator indicated in the packet, whether the packet belongs to the first channel group or the second channel group, and identifying, based on the determined channel group and an identifier indicated in the packet, a radio link channel entity associated with the packet.

A non-transitory computer-readable medium storing code for wireless communications at a device (e.g., a receiving device) is described. The code may include instructions executable by a processor to receive a packet associated with a channel group from a set of available channel groups, the set of available channel groups including a first channel group that includes a first radio bearer and a second channel group that includes a set of second radio bearers, determine, based on a mapping indicator indicated in the packet, whether the packet belongs to the first channel group or the second channel group, and identify, based on the determined channel group and an identifier indicated in the packet, a radio link channel entity associated with the packet.

In some examples of the method, apparatuses, and non-transitory computer-readable medium described herein, the first channel group including a 1:1 mapping between the first radio bearer and a first channel of a backhaul network and the second channel group including a M:1 mapping between the set of second radio bearers and a second channel of the backhaul network.

Some examples of the method, apparatuses, and non-transitory computer-readable medium described herein may further include operations, features, means, or instructions for, based on the channel group, selecting a link of the backhaul network for transmitting the packet based on a UE bearer identifier or a destination address associated with the first packet.

Some examples of the method, apparatuses, and non-transitory computer-readable medium described herein may further include operations, features, means, or instructions for receiving a signal configuring a channel group, the signal indicating whether the channel group may be the first channel group or the second channel group and including a channel identifier.

Some examples of the method, apparatuses, and non-transitory computer-readable medium described herein may further include operations, features, means, or instructions for receiving a second packet including the mapping indicator, a second identifier, and a destination address of the second packet, determining, based on the mapping indicator, whether the second packet belongs to the first channel group or the second channel group, and forwarding the second packet based on the determined channel group, the second identifier, and the destination address of the second packet.

In some examples of the method, apparatuses, and non-transitory computer-readable medium described herein, the mapping indicator may include operations, features, means, or instructions for a control bit, or a logical channel identifier, or a combination thereof.

In some examples of the method, apparatuses, and non-transitory computer-readable medium described herein, the mapping indicator may include operations, features, means, or instructions for a control bit, or a logical channel identifier, or a combination thereof.

In some examples of the method, apparatuses, and non-transitory computer-readable medium described herein, the identifier includes a user equipment radio bearer identifier and the second identifier includes a logical channel identifier.

In some examples of the method, apparatuses, and non-transitory computer-readable medium described herein, the mapping indicator, the identifier, or a combination thereof, may be indicated in a packet header of the packet.

In some examples of the method, apparatuses, and non-transitory computer-readable medium described herein, the packet header may include operations, features, means, or instructions for a MAC sub-header, a MAC sub-header extension, an extension header, a RLC header, an adaption layer header, a General-Packet-Radio-Service-Tunneling-Protocol header, or a combination thereof.

DETAILED DESCRIPTION

Figure 1:
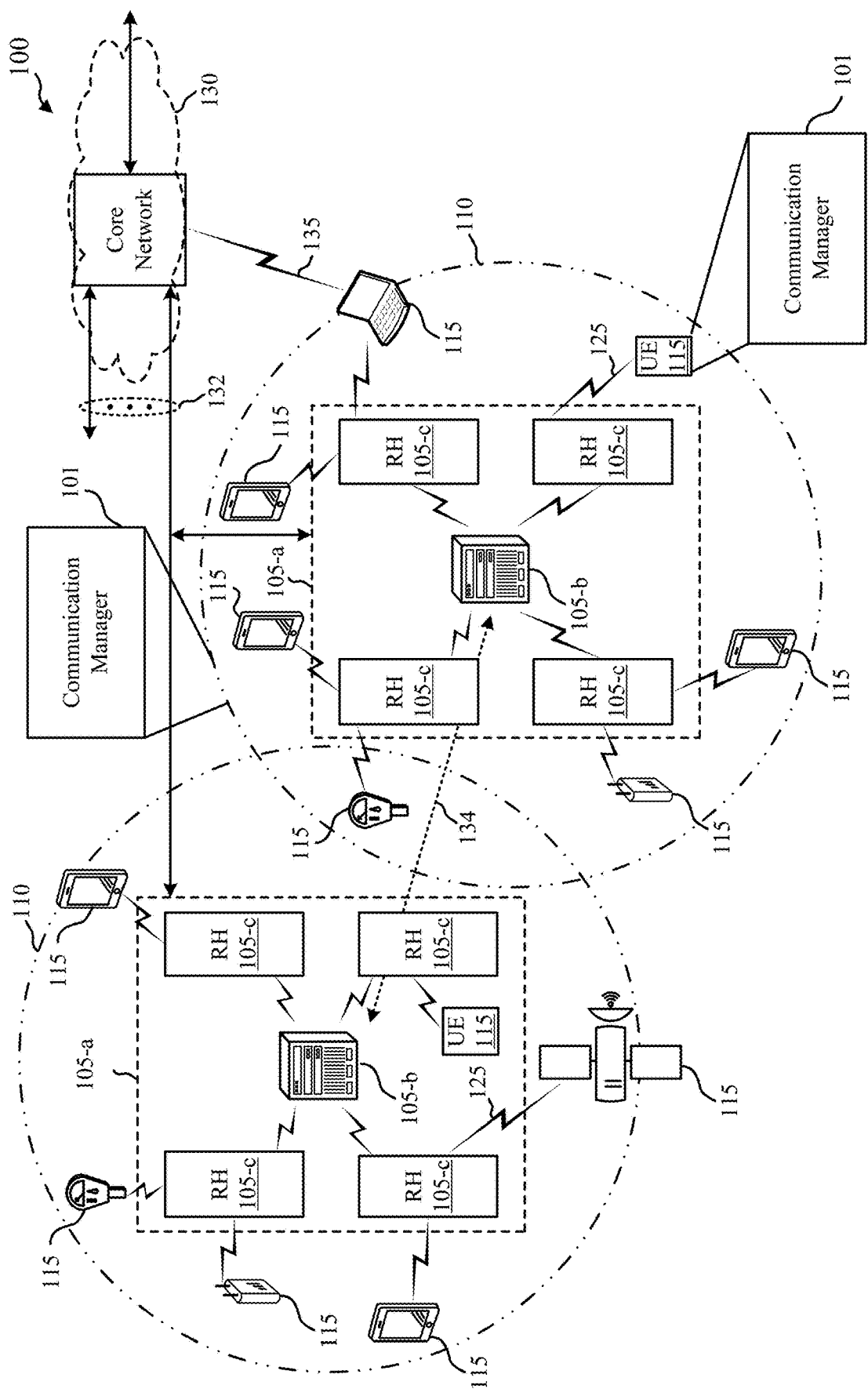
FIG. 1 illustrates an example of a system for wireless communications that supports bearer mapping on wireless backhaul using cellular radio access technologies, in accordance with one or more aspects of the present disclosure.

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Some wireless communication systems, such as those operating in a mmW spectrum, may include access nodes (ANs), which may also be referred to as anchor nodes or devices, to facilitate wireless communication between a UE and the network. In some cases, an anchor AN (or anchor device) may have a high-capacity, wired, backhaul connection (e.g., fiber) to the network, while communicating simultaneously with one or more downstream ANs (e.g., downstream relay devices) or UEs. A network that supports communications between an AN and a UE may be referred to as an access network, while a network that supports communications between one or more ANs may be referred to as a backhaul network and/or a wireless backhaul. In deployments supporting both access and backhaul, the network may be an Integrated Access and Backhaul (IAB).

Some wireless backhaul networks may support a plurality of backhaul links for channels, such as radio link control (RLC) channels. In some aspects, each channel may carry a single radio bearer of a UE. In other aspects, each channel may carry a bundled set of radio bearers from the same UE or from a plurality of UEs. As one non-limiting example, a medium access control (MAC) scheduler may apply different quality of service (QoS) treatment to such backhaul channels in order to enforce QoS requirements for each of the UE radio bearers. For example, when each UE radio bearer is mapped one-to-one (1:1) to one backhaul RLC channel, the UE radio bearer's specific QoS requirement can be guaranteed across the backhaul link. Using this technique, a large number of RLC channels may be supported on each backhaul link, which may easily exceed the currently configured logical channel identifier (LCID) space, which may create scalability issues. Alternatively, some networks may support a plurality of UE radio bearers being mapped to one backhaul RLC channel, thus avoiding extending a LCID space (e.g., as it reduces the number of RLC channels). While this may support improved scalability, this may raise issues with respect to the per-UE radio bearer QoS (or some other performance metric) being supported. That is, different QoS (or other performance metric) requirements for each of the UE radio bearers may create issues when many-to-1 (M:1) mapping is used.

Aspects of the disclosure are initially described in the context of a wireless communication system. Generally, the described techniques provide a mechanism that enables the dynamic combination of both 1:1 mapping and M:1 mapping of UE radio bearers to logical channels in a wireless backhaul network, such as an IAB network. Broadly, aspects of the described techniques may include the UE radio bearers being divided into two groups, with those in the first group being 1:1 mapped while those in the second group are aggregated to a backhaul RLC channel (e.g., M:1 mapped). This may support maintaining the performance metrics of the UE radio bearers (e.g., such as QoS support) for some UE radio bearers, while improving overall scalability since a large quantity of radio bearers can use M:1 mapping. To support such a group differentiation, a portion of a packet (e.g., such as a L2 header stack) may carry or convey an indicator that specifies whether 1:1 or M:1 mapping is used (e.g., such as a mapping indicator). In some examples, the logical channel ID may be used for the mapping indicator. When M:1 radio bearer mapping is used, the existing mapping between the LCID and the RLC channel may be reused since a few logical channels are needed. For 1:1 radio bearer mapping, an RLC channel identifier may be included in the packet (e.g., such as in a packet header, which may be an RLC header, a MAC sub-header, and the like). In some examples, the UE radio bearer identifier may be used, which may be already included in the header stack for solutions that leverage central unit/distributed unit (CU/DU) architecture for access links.

Accordingly, aspects of the described techniques may refer to a transmitting device (or node), relay device (or node), and a receiving device (or node). Broadly, a transmitting device may refer to a device that is receiving one or more radio bearers from an associated UE over an access link that are to be forwarded upstream within the wireless backhaul network. In some aspects, the transmitting device may identify two channel groups based on the radio bearers to be forwarded. A first channel group may include a first radio bearer (e.g., may use 1:1 mapping) and a second channel group may include a set of second radio bearers (e.g., may use M:1 mapping). Broadly, the transmitting device may transmit a first packet of the first channel group on the first channel (e.g., RLC channel) of the wireless backhaul that carries or conveys an indication of the mapping indicator that is set to a first value (e.g., set to a value or value type that is associated with the packet utilizing 1:1 mapping). In some examples, the LCID may be used for the mapping indicator. In some aspects, the first packet may carry or convey an indication of a first identifier associated with the first channel (e.g., such as a UE radio bearer identifier, an RLC channel identifier, a logical channel ID, and the like). Additionally or alternatively, the transmitting device may transmit a second packet from the second channel group on the first channel (or on a second channel) of the wireless backhaul network. The second packet may carry or otherwise convey an indication of a mapping indicator that is set to a value (e.g., a second value) that is different from the first value (e.g., to convey an indication that M:1 mapping is used for the second packet). In some aspects, second packet may also carry or convey an indication of the second identifier associated with the first (or second) channel.

A receiving device may generally be referred to as device receiving one or more packets within a wireless backhaul network. In some examples a receiving device is the destination device for the packets and/or may be a relay node within the wireless backhaul network that forwards the packets according to the described techniques. For example, the receiving device may receive a packet that is associated with a channel group from a set of available channel groups (e.g., that is associated with either the first channel group or with the second channel group). The receiving device may use the mapping indicator to determine whether the packet belongs to the first channel group or the second channel group and use the determined channel group and the identifier (when indicated in the packet) to identify an RLC entity associated with the packet.

Aspects of the disclosure are further illustrated by and described with reference to apparatus diagrams, system diagrams, and flowcharts that relate to bearer mapping on wireless backhaul using cellular radio access technologies.

FIG. 1 illustrates an example of a wireless communication system 100 that supports elevation restriction beamforming in wireless systems, in accordance with one or more aspects of the present disclosure. The wireless communication system 100 includes network devices 105, UEs 115, and a core network 130. In some examples, the wireless communication system 100 may be an LTE network, an LTE-A network, an LTE-A Pro network, or a NR network. In some cases, wireless communication system 100 may support enhanced broadband communications, ultra-reliable (e.g., mission critical) communications, low latency communications, or communications with low-cost and low-complexity devices.

The core network 130 may provide user authentication, access authorization, tracking, IP connectivity, and other access, routing, or mobility functions. At least some of the network devices 105 (e.g., network device 105-*a*), which may be an example of a base station (e.g., eNB, network access devices, gNB), or network device 105-*b*, which may be an example of an access node controller (ANC)), may interface with the core network 130 through backhaul links 132 (e.g., S1, S2) and may perform radio configuration and scheduling for communication with the UEs 115. In various examples, the network devices 105-*b* may communicate, either directly or indirectly (e.g., through core network 130), with each other over backhaul links 134 (e.g., X1, X2), which may be wired or wireless communication links.

Each network device 105-*b* may also additionally or alternatively communicate with a number of UEs 115 through a number of other network devices 105-*c*, where network device 105-*c* may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communication system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communication system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communication system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or another interface). Network devices 105 may communicate with one another over backhaul links 134 (e.g., via an X2, Xn, or other interface) either directly (e.g., directly between network devices 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a transmission/reception point (which may be known as a TRP; however, in the present disclosure, TRP will be assumed to stand for total radiated power unless otherwise specified). In some configurations, various functions of each access network entity or network device 105 may be distributed across various network devices (e.g., radio heads and access network controllers) or consolidated into a single network device (e.g., a network device 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., network devices 105 or UEs 115) may have a hardware configuration that supports communications over a particular carrier bandwidth, or may be configurable to support communications over one of a set of carrier bandwidths. In some examples, the wireless communication system 100 may include network devices 105 and/or UEs 115 that can support simultaneous communications via carriers associated with more than one different carrier bandwidth.

Wireless communication system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, cellular radio access technologies (RATs), such as mmW-based radio access technologies (RATs), may be used to support access traffic between UEs 115 and network device 105, in addition to backhaul and access traffic among multiple network devices 105. Moreover, both access and backhaul traffic may share the same resources (e.g., as in the case of IAB). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments. Thus, using a mmW RAT may enable wireless backhaul communication using one or more node functions at a wireless device, such as a network device 105, an access node, or UE 115.

In some aspects, UEs 115 and/or network devices 105 (when acting as a transmitting device) may include a communication manager 101, which may identify a first channel group comprising a first radio bearer and a second channel group comprising a set of second radio bearers. In some examples, the first channel group comprises a 1:1 mapping between the first radio bearer and a first channel of a wireless backhaul and the second channel group comprising a M:1 mapping between the set of second radio bearers and a second channel of the wireless backhaul. The communication manager 101 may transmit a first packet on the first channel of the first channel group of the wireless backhaul, the first packet comprising a mapping indicator set to a first value and a first identifier associated with the first channel of the first channel group. The communication manager 101 may transmit a second packet on the first channel of the second channel group of the wireless backhaul, the second packet comprising the mapping indicator set to a second value different from the first value and a second identifier associated with the first channel of the second channel group.

In some aspects, UEs 115 and/or network devices 105 (when acting as a receiving device) may include the communication manager 101, which may receive a packet associated with a channel group from a set of available channel groups, the set of available channel groups comprising a first channel group that comprises a first radio bearer and a second channel group that comprises a set of second radio bearers. In some examples, the first channel group comprises a 1:1 mapping between the first radio bearer and a first channel of a wireless backhaul and the second channel group comprising a M:1 mapping between the set of second radio bearers and a second channel of the wireless backhaul. The communication manager 101 may determine, based at least in part on a mapping indicator indicated in the packet, whether the packet belongs to the first channel group or the second channel group. The communication manager 101 may identify, based at least in part on the determined channel group and an identifier indicated in the packet, a radio link channel entity associated with the packet.

Figure 2A:
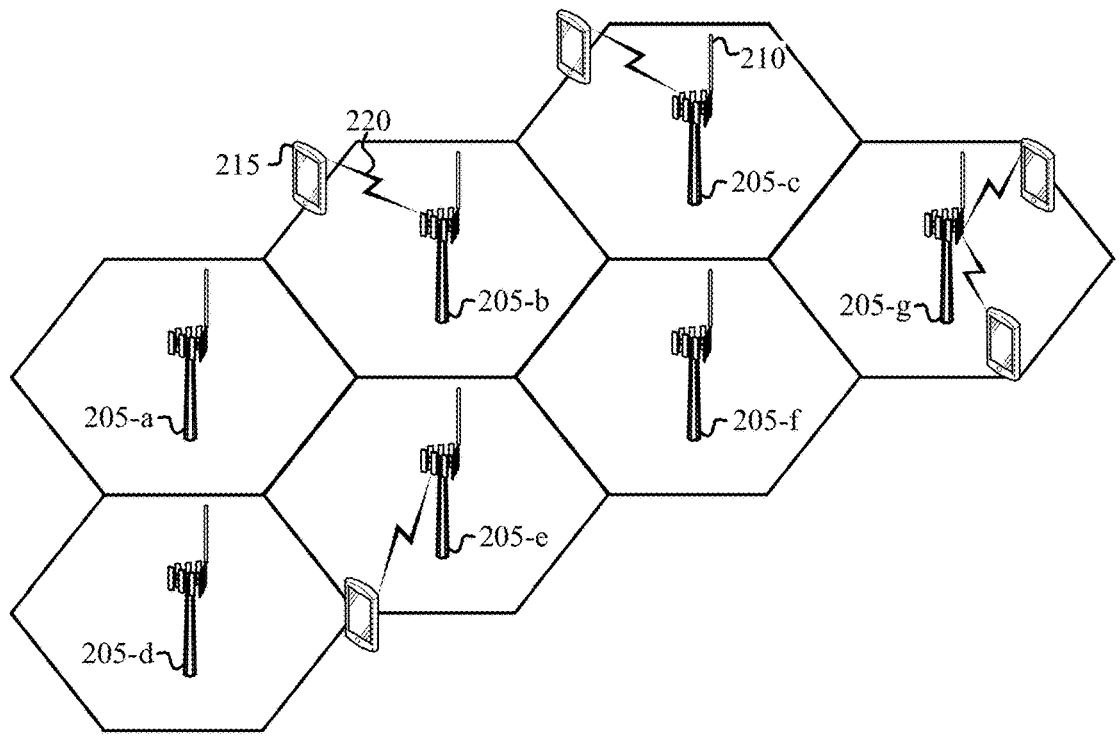
FIGS. 2A and 2B illustrate examples of a wireless communication system that supports bearer mapping on wireless backhaul using cellular radio access technologies, in accordance with one or more aspects of the present disclosure.
Figure 2B:
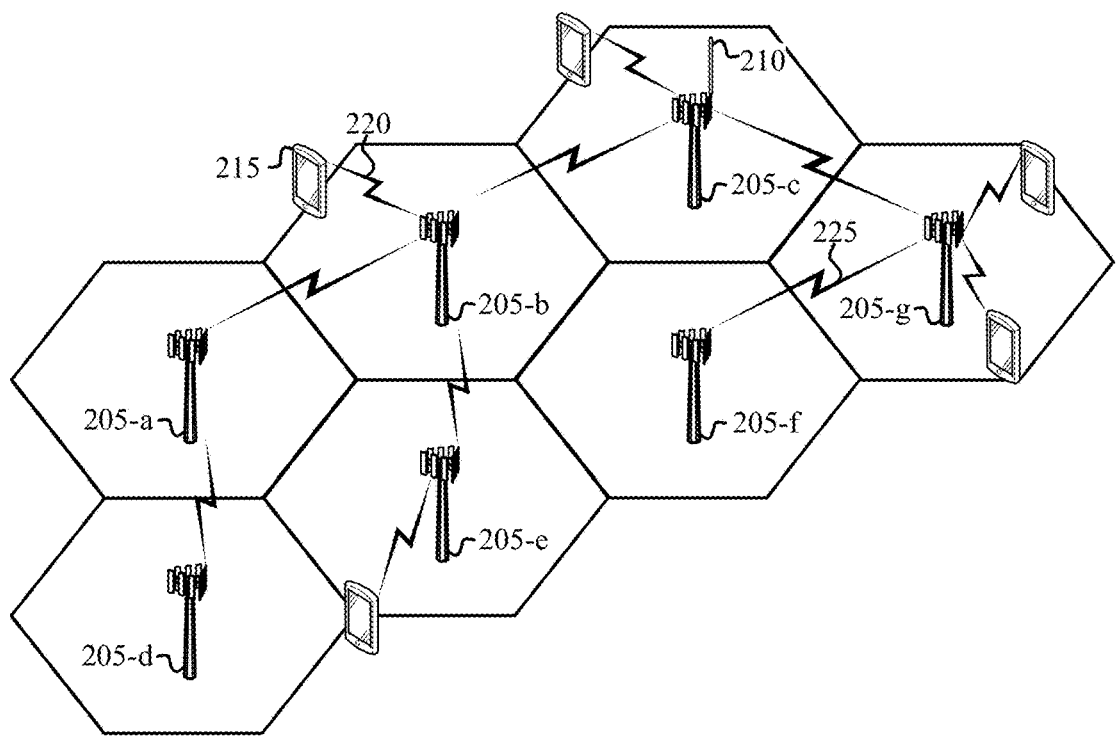

FIGS. 2A and 2B illustrate an example of a wireless communication system 200 that supports bearer mapping on wireless backhaul using cellular radio access technologies, in accordance with one or more aspects of the present disclosure. In some examples, wireless communication system 200 may implement aspects of wireless communication system 100. In some examples, wireless communication system 200 may be an example of a mmW network. Generally, wireless communication system 200 may include a plurality of base stations (or network devices) 205 and UEs 215, which may be examples of corresponding devices described herein.

Some wireless communication systems may provide multiple access services. For example, multiple access services may include access services (e.g., between a UE 215 and a base station 205) and/or backhaul services (e.g., between a base station 205 and a core network and/or between base stations 205). However, wireless networks may be configured differently. As illustrated in the example of FIG. 2A, each base station 205 may be configured such that is has its own fiber point 210 connecting the base station 205 to the Internet or core network. In this configuration, each UE 215 is provided access services over wireless link 220 by a corresponding base station 205. As one non-limiting example illustrated in FIG. 2A, base station 205-b may provide access services to UE 215 over wireless link 220. Thus, in FIG. 2A, each base station 205 manages its own backhaul operations using its fiber point 210 in connection with a central function of the core network.

However, in some examples wireless networks are configured such that a portion (e.g., one) of the base station 205 has its own fiber point 210. As is illustrated in the example of FIG. 2B, base station 205-c has a fiber point 210. The other base stations 205 (e.g., base stations 205-a, 205-b, and 205-d through 205-g may connect to the Internet or core network via a wireless link 225 established between each base station 205. Generally, each wireless link 225 between base stations 205 may be considered a hop within a wireless backhaul network, where the total number of hops between a base station 205 and a fiber point 210 (which may also be considered an anchor device in this context) is dependent upon the number of wireless links 225. For example, base station 205-a has two hops to get to the nearest anchor device, e.g., the first hop from base station 205-a to base station 205-b, and a second hop from base station 205-b to base station 205-c. Of course each base station 205 may also provide access services over wireless link 220 to any UEs 215 within its coverage area. Generally, wireless links 220 and/or 225 may be cellular or non-cellular links, may be Wi-Fi or non-Wi-Fi wireless links, may be sub-6 GHz links or mmW wireless links, etc.

Multi-hop wireless backhaul networks, e.g., using mmW technology, enables flexible and lower cost deployments of small cells. In some aspects, mmW technologies are well suited for extended wireless backhaul networks due to their support of narrow antenna beams, which highly reduces inter-link interference. Multi-hop wireless backhauling is also important for the rollout of mmW radio access technologies (RATs). Due to the limited range of wireless links 220 used for mmW-based access, mmW cells (e.g., base stations 205) are inherently small in nature. To provide sufficient availability of wireless links 220 for mmW-based access to end users (e.g., UEs 215), highly densified small-cell deployments may be used. The rollout of such highly densified networks may create a backhaul problem. Since mmW-based RAT offers high link capacity, it is possible to integrate wireless links 220 for access with wireless links 225 for backhaul and let mmW base stations 205 backhaul their own access traffic (such as is shown in FIG. 2B).

As discussed above, multi-hop wireless backhaul networks can also be formed using sub-6 GHz frequencies. It is possible, for instance, to use massive-MIMO-based technologies to improve spectral efficiency. In some aspects, wireless communication system 200 may support defining a one-hop backhaul solution using a cellular RAT, which allows the relay device (e.g., base stations 205) to autonomously connect to a donor device (such as an upstream backhaul device), similar to how UE 215 connects to a base station 205. In some aspects, this may be extended to a L3 multi-hop solution, to a L2 routing solution over cellular interfaces which can be used to establish a L2 multi-hop solution.

Generally, access traffic between the UE 215 and a base station 205 may utilize one or more radio bearers. Broadly, each radio bearer may be established to support of a particular function, such as voice over IP (VoIP), web browsing, streaming, and the like. Accordingly, each radio bearer may have its own set of associated performance metrics. Examples of performance metrics include, but are not limited to, a QoS requirement, a latency requirement, a throughput requirement, a guaranteed bit rate (GBR) requirement, a maximum permissible interference level requirement, and the like. Accordingly, some radio bearers may be associated with rather stringent performance metrics (such as video streaming, VoIP, and the like) while other radio bearers may be associated with more relaxed performance metrics (such as web browsing).

Generally, the base station 205 (which may be referred to as a device and/or transmitting device in this context) may receive or otherwise have one or more radio bearers established with each of its associated UEs 215. The base station 205 (or transmitting device) may typically package the information provided via each radio bearer for transmission upstream over the wireless backhaul network (e.g., wireless links 225). In some aspects, base station 205 may communicate the information received over the radio bearers on one or more channels (such as RLC channels).

Broadly, the wireless backhaul links (e.g., wireless links 225) may support multiple RLC channels, radio bearers, protocol data unit (PDU)-sessions, packet data network (PDN)-connections, and the like. Although aspects of the described techniques may commonly refer to an RLC channel, it is to be understood that the described techniques may be applicable to any of the radio bearers, PDU-sessions, PDN and connections, and the like.

In some examples, each wireless backhaul RLC channel may carry or otherwise convey traffic pertaining to one or more UE radio bearers. In one example, 1:1 mapping may be used where each backhaul RLC channel is allocated on each wireless backhaul network to carry one UE radio bearer. Such 1:1 radio bearer mapping may enable enforcement of the performance metrics for the UE radio bearer, such as a GBR, or other radio bearer-specific QoS constraints. This technique, however, has limited scalability as wireless backhaul links further upstream in the backhaul topology may need to support a large number of RLC channels. A large number of LCIDs may be needed in this scenario, which would require extending the configured LCID space (e.g., to support a larger number of a LCIDs).

In another example, the traffic of a plurality of UE radio bearers may be aggregated to a common backhaul RLC channel. This M:1 radio bearer mapping may improve scalability to a larger number of radio bearers since the LCID space may not necessarily need to be increased. However, this technique generally limits the ability for the specific performance metric (or other QoS constraints) to be supported when the plurality of radio bearers are mapped to one RLC channel. Accordingly, aspects of wireless communication system 200 provide improved techniques that combine the benefits of 1:1 radio bearer mapping and M:1 radio bearer mapping over the wireless backhaul network links (e.g., over wireless links 225).

Broadly, the described techniques divide the UE radio bearers into two groups (e.g., a first channel group and a second channel group). The radio bearers associated with the first channel group may generally utilize 1:1 mapping while the radio bearers associated with the second channel group may utilize M:1 mapping. Accordingly, the radio bearers associated with the second channel group may be aggregated to a wireless backhaul RLC channel. This may allow the UE radio bearer-specific performance metric support for some UE radio bearers while improving scalability within the wireless backhaul network since a large number of radio bearers can use the M:1 mapping.

To support such two-group differentiation, the packet carrying traffic for the first channel group and/or the second channel group may carry or convey a mapping indicator that specifies whether 1:1 or M:1 mapping is used. The transmitting device may insert this mapping indicator in the packet for the receiving device to use to differentiate whether the packet belongs to the first channel group for the second channel group.

In some aspects, the mapping indicator may be included in the header of the packet, such as an L2-header. In some aspects, the packet may be included or otherwise conveyed onto the RLC header of the MAC sub-header. Including the mapping indicator in the MAC sub-header, allows differentiation between 1:1 and M:1 radio bearer mapping to be performed lower in the protocol stack at the receiver side. In some aspects, a reserved flag on the MAC sub-header, RLC header, extension header, adaptation layer header, and the like, may be used to signal or convey the indication of the mapping indicator. In some aspects, the adaptation layer header may be a header in a backhaul adaptation protocol layer.

In some aspects, a LCID value (e.g., a first identifier value) may be reserved for use on the MAC sub-header as the mapping indicator for one of the channel groups (e.g., the first channel group, or vice versa). This may support the other LCID values being used to specify logical channels for the other channel group (e.g., the second channel group, or vice versa). For example, a dedicated LCID value may be used to indicate 1:1 radio bearer mapping, which allows using the other LCID values to specify the backhaul RLC channel for M:1 radio bearer mapping. This may allow M:1 radio bearer mapping to reuse existing techniques.

In some aspects, the existing LCID space may be used to specify the RLC channel for M:1 mapped radio bearers. This may support reusing existing techniques for M:1 radio bearer mapping, which implies that different identifiers specify the RLC channel for 1:1 mapped radio bearers. In some aspects, the identifier may be conveyed on the MAC sub-header, RLC header, extension header, adaptation layer header, and the like, of the packet. In some aspects, the identifier may be carried or conveyed above the RLC header (e.g., higher in the protocol stack). In some aspects, the identifier may be carried or conveyed together with the mapping indicator. Broadly, the identifier may be associated with (and therefore indicative of) the RLC channel.

In some aspects, a UE radio bearer identifier may be used to also specify the RLC channel for 1:1 mapped UE radio bearers. The UE radio bearer identifier may already be contained in the header stack, e.g., when the backhaul carries an F-1 interface such as for wireless access using distributed unit/central unit (DU/CU) split architecture. This may avoid adding additional fields in the packet header, and therefore lower packet overhead.

In some aspects, the packet may also carry or convey an indication of an address field for the routing of the packets across the multi-hop topology of the wireless backhaul network. This may allow the relay device to identify the outbound backhaul link based on information carried in the incoming packet and a look up table, such as a routing or forwarding table. For M:1 radio bearer mapping, the address carried in this address field may refer to a relay address, an IAB node address, an anchor address, a donor address, and the like. For 1:1 radio bearer mapping, the address may refer to the same entity, or it may be the UE radio bearer identifier instead. By overloading the address field with the UE radio bearer identifier, this may support the UE identifier being available lower in the header stack. In some cases, different addresses may be used for M:1 and 1:1 radio bearer mapping, which may allow use of the same header field to reduce packet overhead during transport.

In some aspects, the relay device (e.g., a base station 205 that his upstream from the transmitting device within the wireless backhaul network) may be configured with information to support aspects of the described techniques. For example, the relay device may be configured with a backhaul RLC channel over a backhaul wireless link (e.g., wireless link 225). In some aspects, the relay device may be configured with the type of the RLC channel, e.g., whether it supports M:1 and/or 1:1 radio bearer mapping. In some aspects, the relay device may be configured with a mapping between the identifier carried in a packet for this type of RLC channel and the corresponding RLC entity. As discussed, the identifier may be different for M:1 radio bearer mapping and for 1:1 radio bearer mapping. The identifier may refer to a UE radio bearer identifier, an RLC channel identifier, a logical channel ID, or some other identifier.

Accordingly, a transmitting device (e.g., a base station 205 that has one or more configured radio bearers with its associated UEs) may generally identify the first channel group and the second channel group. In some examples, the first channel group utilizes a 1:1 radio bearer mapping (e.g., includes a first radio bearer) and the second channel group utilizes a M:1 radio bearer mapping (e.g., includes a set of second radio bearers). Generally, the transmitting device may divide its radio bearers between the first channel group and the second channel group. For example, radio bearers having a performance metric satisfying a threshold (e.g., having a high QoS constraint, low latency, high GBR, and the like) may be allocated or otherwise associated with the first channel group whereas other radio bearers having a performance metric failing to satisfy the threshold may be allocated or otherwise associated with a second channel group, or vice versa. In other examples, the transmitting device may allocate radio bearers to the second channel group when the radio bearers have the same or similar performance metric requirements and allocate radio bearers to the first channel group when there is one instance of a particular performance metric requirement. Although the described techniques generally for to a first channel group and a second channel group, it is to be understood that the transmitting device may allocate more than one radio bearer to the first channel group (e.g., may have a plurality of RLC channels that utilize 1:1 radio bearer mapping). Similarly, it is to be understood that transmitting device may have more than one second channel group (e.g., may have a plurality of RLC channels, with each RLC channel utilizing M:1 radio bearer mapping).

When transmitting the traffic contained in the radio bearers, the transmitting device may transmit a first packet of the first channel group on the first channel of the wireless backhaul. As discussed, the first packet may carry or convey an indication of a mapping indicator that is set to a value that corresponds to the first channel group (e.g., conveys an indication that the packet is associated with the first channel group or otherwise uses 1:1 radio bearer mapping). Moreover, the transmitting device may configure the first packet with an identifier associated with the first channel. The transmitting device may transmit the first packet upstream within the wireless backhaul network.

Moreover, the transmitting device may transmit a second packet of the second channel group on a second channel (or the first channel) of the wireless backhaul network. Again, the second packet may carry or otherwise convey an indication of the mapping indicator that is set to a value (e.g., a second value) that is different from the first value set for the mapping indicator in the first packet. That is, the mapping indicator may be set to a value that is associated with the RLC channel (e.g., the second channel) utilizing M:1 radio bearer mapping. Moreover, the second packet may carry or convey an indication of a second identifier that is associated with a second (or first) channel.

The device receiving packets within the wireless backhaul network may utilize the mapping indicator carried in the packet to determine whether the packet belongs to the first channel group (e.g., uses 1:1 radio bearer mapping) or the second channel group (e.g., uses M:1 radio bearer mapping). The receiving device may use the corresponding channel group and the identifier indicated in the packet to determine an RLC entity associated with the packet. Accordingly, the receiving device may process the packet based on the RLC entity associated with packet.

Figure 3:
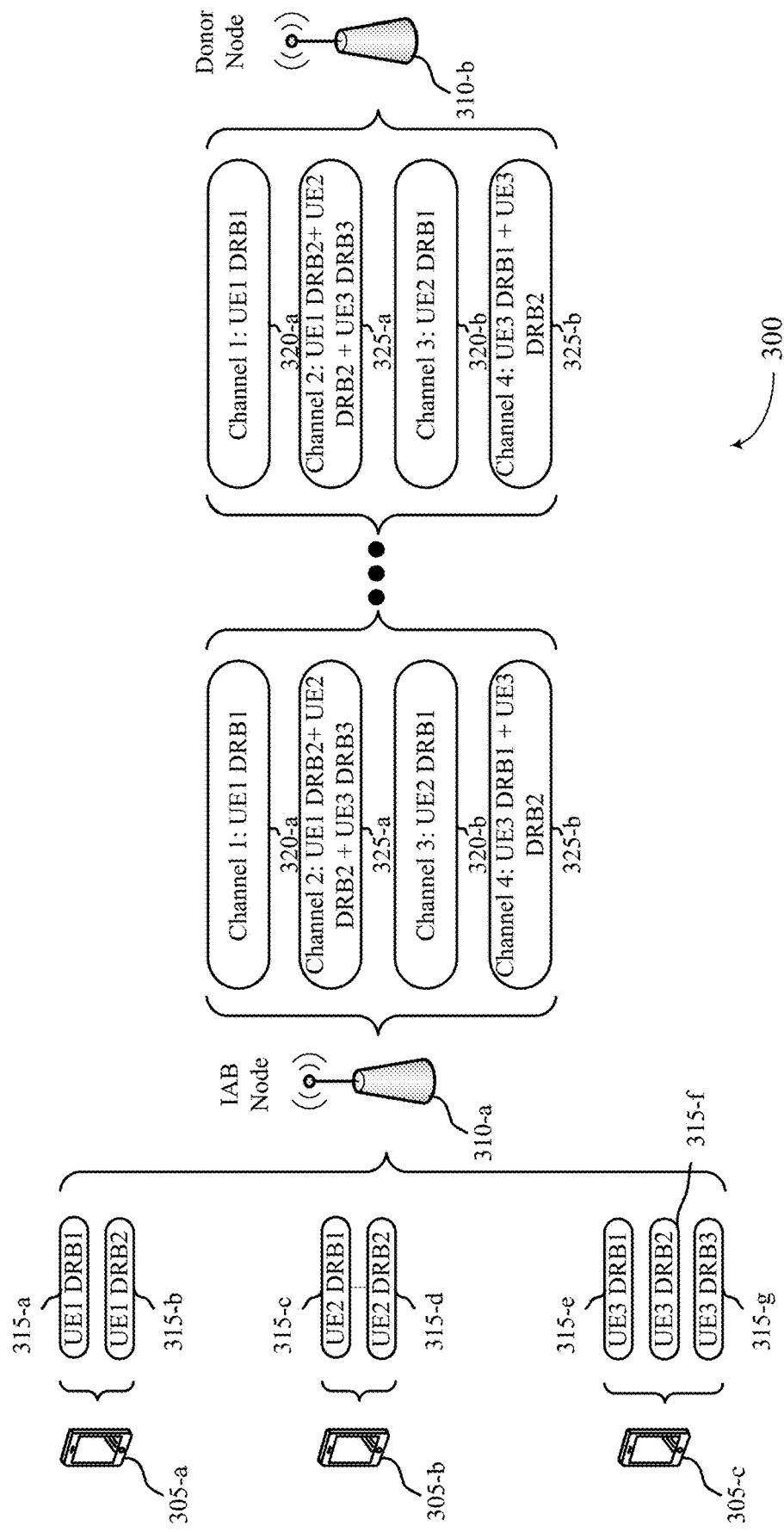
FIG. 3 illustrates an example of a wireless communication system that supports bearer mapping on wireless backhaul using cellular radio access technologies, in accordance with one or more aspects of the present disclosure.

FIG. 3 illustrates an example of a wireless communication system 300 that supports bearer mapping on wireless backhaul using cellular radio access technologies, in accordance with one or more aspects of the present disclosure. In some examples, wireless communication system 300 may implement aspects of wireless communication systems 100 and/or 200. Aspects of wireless communication system 300 may include a plurality of UEs 305 and one or more nodes 310, which may be examples of corresponding devices described herein. In some aspects, each node 310 may be a node or device within a wireless backhaul network, such as an IAB network. In some aspects, wireless communication system 300 may be a mmW wireless network.

Generally, each UE 305 may have one or more radio bearers 315 established between the UE 305 and a base station (e.g., such as the node 310-a). For example, UE 305-a may have two radio bearers 315 (e.g., radio bearer 315-a and radio bearer 315-b), UE 305-b may also have two radio bearers 315 (e.g., radio bearer 315-c and radio bearer 315-d), and UE 305-c may have three radio bearers 315 (e.g., radio bearer 315-e, radio bearer 315-f, and radio bearer 315-g) established with node 310-a. Broadly, each radio bearer 315 may be established for different purpose (e.g., for web browsing, VoIP, streaming, and the like).

Moreover, each radio bearer 315 may have its own set of associated performance metric constraints or requirements. For example, a radio bearer 315 that is associated with streaming may have a higher performance metric (e.g., QoS constraint, GBR requirement, and the like) than a radio bearer 315 that is associated with web browsing.

In some aspects, each radio bearer 315 may have its own UE radio bearer identifier. For example, radio bearer 315-e may have a corresponding UE radio bearer identifier of DRB1 and radio bearer 315-f may have a corresponding UE radio bearer identifier of DRB2, and so forth. In some aspects, each radio bearer 315 may also be associated with a corresponding UE identifier. For example, the UE radio bearer identifier DRB2 associated with UE 305-b may have a corresponding UE identifier of UE2. Lastly, each radio bearer 315 may be a different type of radio bearer, e.g., may be a data radio bearer, or control radio bearer, and the like.

For the purpose of the described techniques, node 310-a may be considered a transmitting device of the wireless backhaul network. Accordingly, node 310-a may establish a plurality of channel groups 320 (e.g., such as RLC channel groups) with which to communicate the radio bearers 315 upstream within the wireless backhaul network. For example, node 310-a may establish a first channel group 320 that is associated with a first channel (e.g., a first RLC channel) and that uses 1:1 radio bearer mapping and a second channel group 325 that is associated with the second channel (e.g., a second RLC channel). In some aspects, the first channel group may additionally or alternatively be associated with the first channel.

In the example illustrated in FIG. 3, node 310-a may identify, configure, or otherwise create two of the first channel groups 320 (e.g., first channel group 320-a and first channel group 320-b) and two of the second channel groups 325 (e.g., second channel group 325-a and second channel group 325-b). It is to be understood that node 310-a may identify, configure or otherwise create any number of the first channel groups 320 and/or the second channel groups 325 (e.g., depending on the number/type of radio bearers that node 310-a has to communicate upstream).

Thus, each of the first channel groups 320 may include or otherwise be associated with the first radio bearer 315. For example, first channel group 320-a may be associated with radio bearer 315-a and the first channel group 320-b may be associated with radio bearer 315-c. That is, each of the first channel groups 320 may utilize 1:1 radio bearer 315 mapping where one radio bearer 315 is mapped to each associated channel (e.g., to each backhaul RLC channel).

Similarly, each of the second channel groups 325 may include or otherwise be associated with a set of second radio bearers 315. For example, second channel group 325-a may be associated with radio bearers 315-b, 315-d, and 315-g. The second channel group 325-b may be associated with radio bearers 315-e and 315-f That is, each of the second channel groups 325 may utilize M:1 radio bearer 315 mapping where two or more radio bearers 315 are mapped to each associated channel (e.g., to each backhaul RLC channel).

As discussed, the transmitting device (e.g., node 310-*a*) may map the radio bearers 315 to the first channel group 320 or the second channel group 325 depending on a variety of factors. As one example, node 310-*a* may autonomously map the radio bearers 315 to the respective channel group randomly. As another example, node 310-*a* may map radio bearers 315 having similar performance metric requirements to second channel groups 325 and map radio bearers 315 having a unique channel performance metric requirement to a first channel group 320. As another example, node 310-*a* may map radio bearers 315 to a corresponding channel group based on which UE 305 the radio bearer 315 is associated with. In another example, node 310-*a* may map radio bearers 315 to a corresponding channel group based on an order or sequence associated with the radio bearer 315 identifiers. Other grouping techniques may also be utilized in accordance with aspects of the described techniques.

In some aspects, node 310-*a* may transmit or otherwise provide packets upstream within the wireless backhaul network that are configured according to whether the packet is associated with the first channel group 320 or with a second channel group 325. For example, node 310-*a* may transmit a first packet from a first channel group 320 on the first channel of the wireless backhaul network. Similarly, node 310-*a* may transmit a second packet from the second channel group 325 on a second channel (or the first channel) of the wireless backhaul network. In some aspects, node 310-*a* may transmit packets over each channel (e.g., backhaul RLC channel) configured according to whether the packet is associated with the first channel group 320 or with the second channel group 325.

For example, node 310-*a* may configure each packet (e.g., the first packet and the second packet) to carry or otherwise convey an indication of a mapping indicator that signals to a receiving device whether the packet belongs to the first channel group 320 or the second channel group 325 (e.g., whether the packet utilizes 1:1 or M:1 radio bearer 315 mapping). As discussed, the mapping indicator may be configured in the header or preamble portion of the packet, such as in a MAC sub-header, an RLC header, an extension header, an adaptation layer header, a General-Packet-Radio-Service-Tunneling-Protocol header, and the like. In some aspects, the mapping indicator may be carried or conveyed in a control bit, a LCID, and the like In some aspects, node 310-*a* may also configure each packet (e.g., the first packet and the second packet) to carry or otherwise convey an indication of an identifier. Broadly, the identifier may associate the packet with an RLC entity (e.g., RLC channel) corresponding to the packet. For example, the identifier may be carried or otherwise conveyed in the MAC sub-header, RLC header, extension header, an adaptation layer header, a General-Packet-Radio-Service-Tunneling-Protocol header, and the like, of the packet. A receiving device may determine whether the packet is associated with the first channel group 320 or the second channel group 325 based on the mapping indicator, and then use the channel group of the packet and the identifier to identify the RLC entity (e.g., the RLC channel). Generally, node 310-*a* may transmit the packet upstream (e.g., may select which link of the wireless backhaul network to use) based on the destination address, based on a UE identifier, based on a UE radio bearer identifier, and the like, associated with packet.

Generally, the node 310-*a* may transmit the packets upstream via one or more hops (as illustrated by ellipses) to node 310-*b*, which may be an example of a donor or anchor node. Generally, node 310-*b* may be an anchor node that forwards the packet to the Internet, core network, and the like. Accordingly, node 310-*b* may receive the packet and use the mapping indicator to determine whether the packet is associated with the first channel group 320 or the second channel group 325. Node 310-*b* may use the corresponding channel group and the identifier conveyed in the packet to identify the RLC entity, e.g., for packet processing based on the RLC channel. In some examples, this may include node 310-*b* (e.g., such as when acting as a relay device of the wireless backhaul network) forwarding the packet based on the determined channel group, identifier, and the destination address carried or otherwise conveyed in the packet. In some aspects, the destination address may also be referred to as a routing identifier (ID). The routing ID may be included if the packet is for M:1 radio bearer mapping. If the packet is for 1:1 radio bearer mapping, the routing ID may be omitted, e.g., to reduce overhead, processing, and the like.

Accordingly, aspects of the described techniques provide a mechanism whereby both 1:1 and M:1 radio bearer mapping may be used for backhaul RLC channels. This may allow for flexibility in communicating the packets and improve backhaul network performance.

Figure 4:
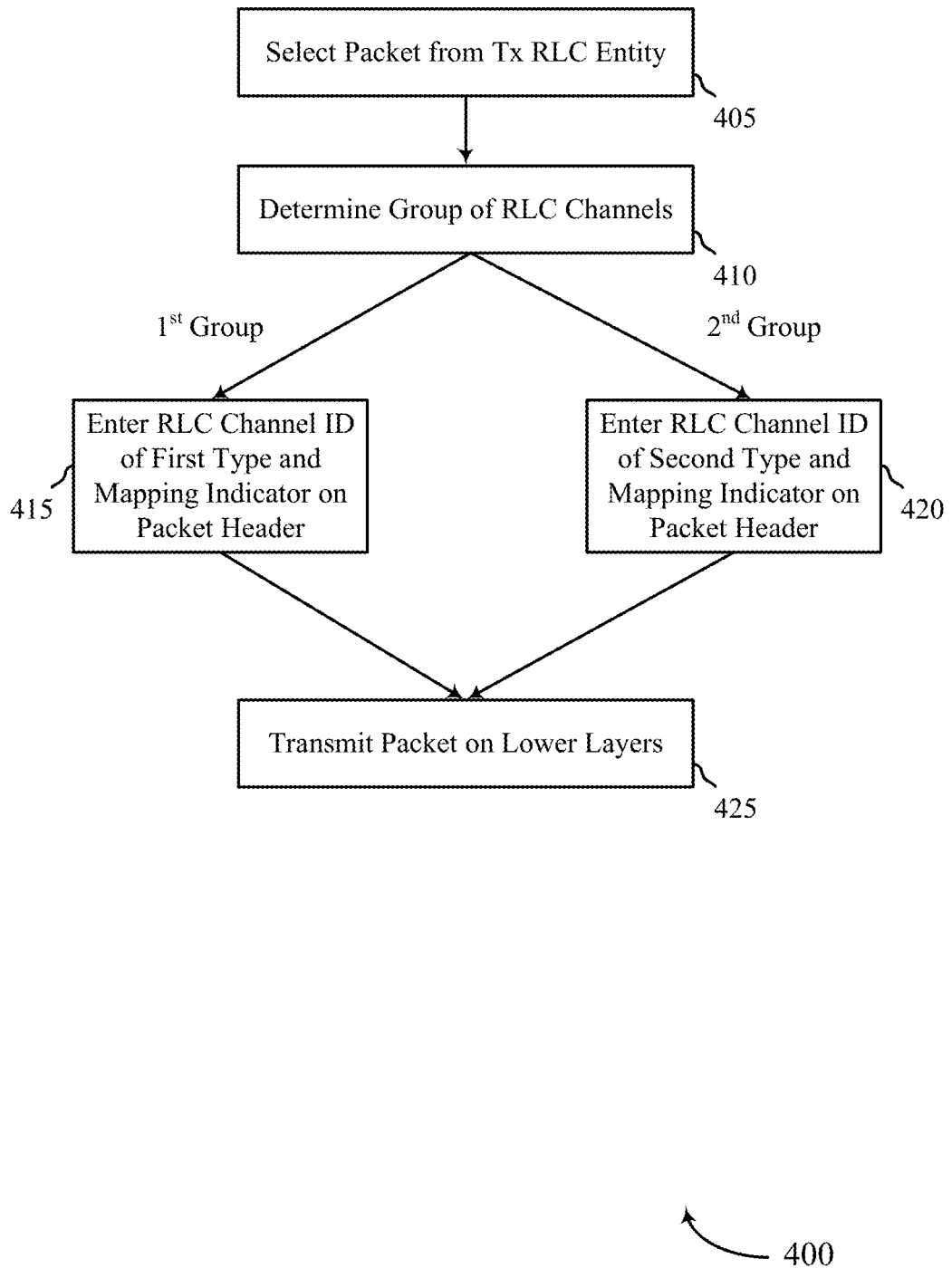
FIG. 4 illustrates an example of a process that supports bearer mapping on wireless backhaul using cellular radio access technologies, in accordance with one or more aspects of the present disclosure.

FIG. 4 illustrates an example of a process 400 that supports bearer mapping on wireless backhaul using cellular radio access technologies, in accordance with one or more aspects of the present disclosure. In some examples, process 400 may implement aspects of wireless communication systems 100, 200 and/or 300. Aspects of process 400 may be implemented by a transmitting device (e.g., a UE 115, a base station, and/or a network device 105), which may be examples of the corresponding devices described herein. In some aspects, the transmitting device may be a node or device of a wireless backhaul network, such as an IAB network. In some aspects, the wireless backhaul network may be a mmW network.

At 405, the transmitting device may select a packet for transmission over a wireless backhaul network from a transmitting (Tx) RLC entity. For example, a MAC scheduler may select a packet, such as an RRC PDU, from one of the transmitting RLC entities.

At 410, the transmitting device may determine a group of RLC channels (e.g., a first channel group that uses 1:1 radio bearer mapping and a second channel group that uses M:1 radio bearer mapping). For example, the transmitting device may determine whether the RLC entity is associated with the first channel group (e.g., uses 1:1 radio bearer mapping) or the second channel group (e.g., uses M:1 radio bearer mapping). As discussed, the transmitting device may group radio bearers based on a variety of factors.

At 415 and for the first channel group, the transmitting device may add, configure, or otherwise enter an RLC channel identifier of a first type and the mapping indicator on a packet header. At 420 and for the second channel group, the transmitting device may add, configure, or otherwise enter an RLC channel identifier of the second type and the mapping indicator on the packet header. In some aspects, the RLC channel identifier may use a different type of value for each channel group. For example, for M:1 radio bearer mapping, the RLC channel identifier may be the LCD, whereas for 1:1 radio bearer mapping, the RLC channel identifier may be the UE radio bearer identifier. In some aspects, the RLC channel identifier may use a different field in the packet header depending on which type is being used.

At 425, the transmitting device may transmit the packet via lower layers (e.g., via layer 1 or L1) across a wireless backhaul network. In some aspects, this may include the transmitting device using concatenation of the MAC service data unit (SDU) with other MAC SDU's from other RLC channels into the same transport block, for physical layer processing, and the like. In some aspects, the operations described with respect to process 400 may be performed at different layers of the transmitting device. As one example, the identifier (e.g., in RLC channel identifier) may be contained within the packet, such as the UE radio bearer identifier, which remains on the packet over multiple hops.

Figure 5:
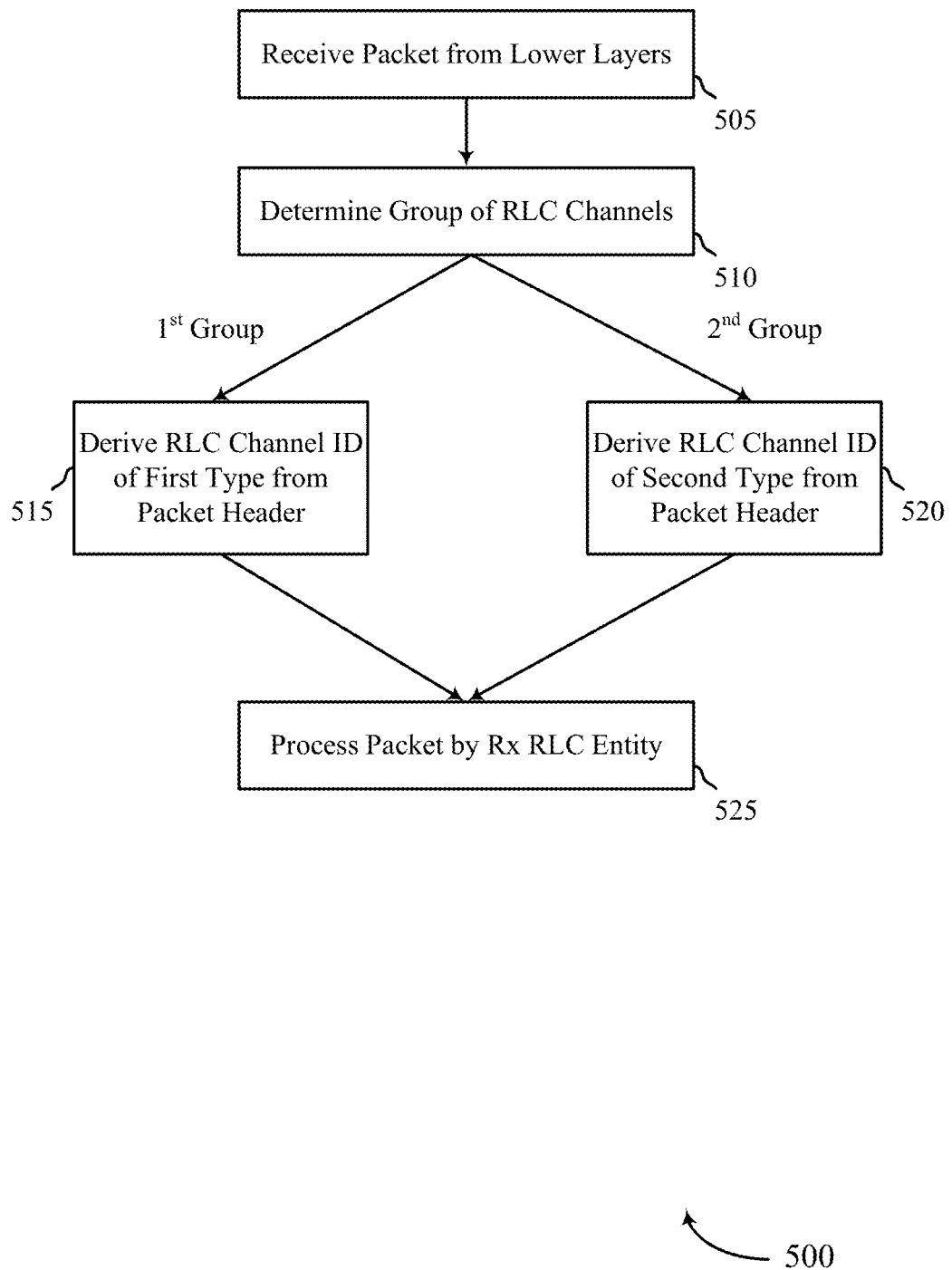
FIG. 5 illustrates an example of a process that supports bearer mapping on wireless backhaul using cellular radio access technologies, in accordance with one or more aspects of the present disclosure.

FIG. 5 illustrates an example of a process 500 that supports bearer mapping on wireless backhaul using cellular radio access technologies, in accordance with one or more aspects of the present disclosure. In some examples, process 500 may implement aspects of wireless communication systems 100, 200 and/or 300. Aspects of process 500 may be implemented by a receiving device (e.g., a UE 115, a base station, and/or a network device 105), which may be examples of the corresponding devices described herein. In some aspects, the receiving device may be a node or device of a wireless backhaul network, such as an IAB network. In some aspects, the wireless backhaul network may be a mmW network.

At 505, the receiving device may receive a packet from lower layers (e.g., from L1 after being received over a wireless link of the backhaul network). For example, the MAC layer of the receiving device may receive the packet, such as a MAC PDU, from the lower layers of the receiving device.

At 510, the receiving device may determine the group of RRC channels (e.g., may determine or otherwise identify the first channel group that uses 1:1 radio bearer mapping and the second channel group that uses M:1 radio bearer mapping). In some aspects, the receiving device may determine, for each MAC SDU, whether it pertains to the first channel group or the second channel group. In some aspects, this may be determined based on a mapping indicator carried or conveyed in the packet.

At 515 and for the first channel group, the receiving device may derive or otherwise determine the RLC channel identifier (e.g., the first identifier) of the first type for the packet header. At 520 and for the second channel group, the receiving device made derive or otherwise determine the RLC channel identifier of the second type (e.g., the second identifier) for the packet header. Dependent upon whether the packet is associated with the first channel group or with the second channel group, the receiving device may determine the RLC channel identifier from different fields of the packet header. In an example where the packet is associated with the second channel group (e.g., uses M:1 radio bearer mapping), the RLC channel identifier may be the LCID. In the example where the packet is associated with the first channel group (e.g., uses 1:1 radio bearer mapping), the RLC channel identifier may be the UE radio bearer identifier.

At 525, the receiving device may process the packet based on the receiver side RLC entity. For example and based on the RLC channel, the receiving device may forward the packet to the RLC entity for receiver RLC processing. In some aspects, the operations described with respect to process 500 may be performed at different layers of the receiving device. As one example, the identifier (e.g., in RLC channel identifier) may be contained within the packet, such as the UE radio bearer identifier, which remains on the packet over multiple hops.

Figure 6:
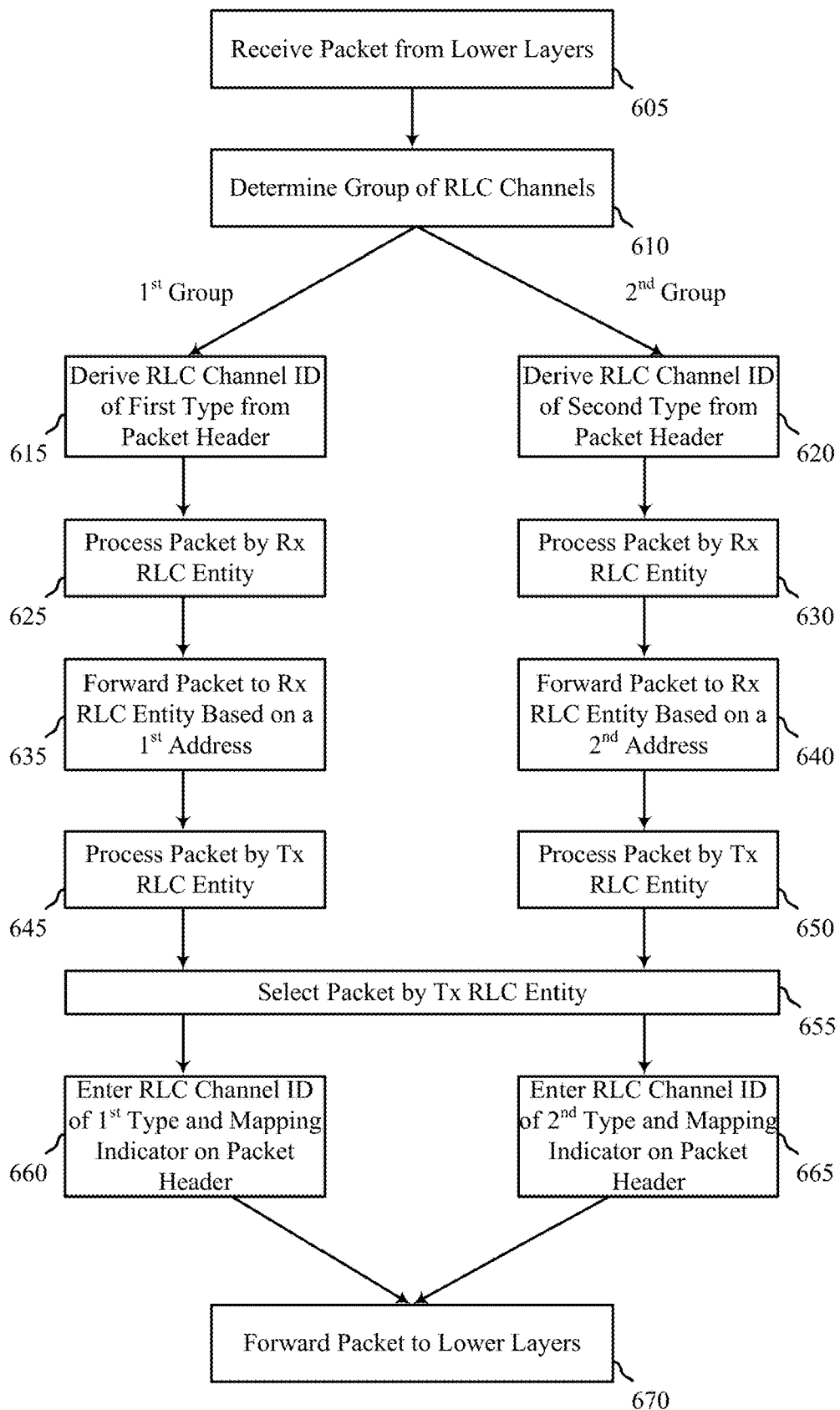
FIG. 6 illustrates an example of a process that supports bearer mapping on wireless backhaul using cellular radio access technologies, in accordance with one or more aspects of the present disclosure.

FIG. 6 illustrates an example of a process 600 that supports bearer mapping on wireless backhaul using cellular radio access technologies, in accordance with one or more aspects of the present disclosure. In some examples, process 600 may implement aspects of wireless communication systems 100, 200 and/or 300. Aspects of process 600 may be implemented by a relay device (e.g., a UE 115, a base station, and/or a network device 105), which may be examples of the corresponding devices described herein. In some aspects, the relay device may be a node or device of a wireless backhaul network, such as an IAB network. In some aspects, the wireless backhaul network may be a mmW network.

At 605, the relay device may receive a packet from one or more lower layers (e.g., from L1). At 610, the relay device may determine the group of RRC channels. At 615 and for the first channel group, the relay device may derive or otherwise determine the RLC channel identifier of the first type in the packet header. At 620 and for the second channel group, the relay device may derive or otherwise determine the RLC channel identifier of the second type in the packet header. At 625 and for the first channel group, the relay device may process the packet based at least in part on the receiving RLC entity. At 630 and for the second channel group, the relay device may process the packet based at least in part on the receiving RLC entity. In some aspects, the functions performed at 605-630 may be substantially the same as the operations described with respect to process 500.

At 635 and for the first channel group, the relay device may forward the packet to the receiving RLC entity based on a first address. At 640 and for the second channel group, the relay device may forward the packet to the receive RLC entity based on a second address. At 645 and for the first channel group, the relay device may process the packet based on a transmitting RLC entity. At 650 and for the second channel group, the relay device may process packet based on the transmitting RLC entity. In some aspects, this may include the relay device forwarding or routing the packet from the transmitting RLC entity to the receiving RLC entity. This forward/routing may be based on a first address for packets pertaining to RLC channels in the first channel group and based on a second address for packets pertaining to RLC channels of the second channel group. When the packet is associated with the first channel group (e.g., uses 1:1 radio bearer mapping), this address may refer to a relay address. When the packet is associated with the second channel group (e.g., uses M:1 radio bearer mapping), this address may refer to a UE radio bearer identifier.

At 655, the relay device may select the packet for transmission based at least in part on the transmitting RLC entity. In some aspects, this may include the transmitting RLC entity processing the selected packet. In some aspects, this may include the MAC scheduler selecting a packet from the queues of various transmission RLC entities for transmission.

At 660 and for the first channel group, the relay device may add, configure, or otherwise enter an RRC channel identifier of the first type and a mapping indicator in the packet header. At 665 and for the second channel group, the relay device may add, configure, or otherwise enter an RLC channel identifier of the second type and a mapping indicator in the packet header. At 670, the relay device may forward the packet to lower layers for transmission across the wireless backhaul network. In some aspects, the features of 660-675 may be substantially the same as the features described with respect to process 400.

Figure 7:
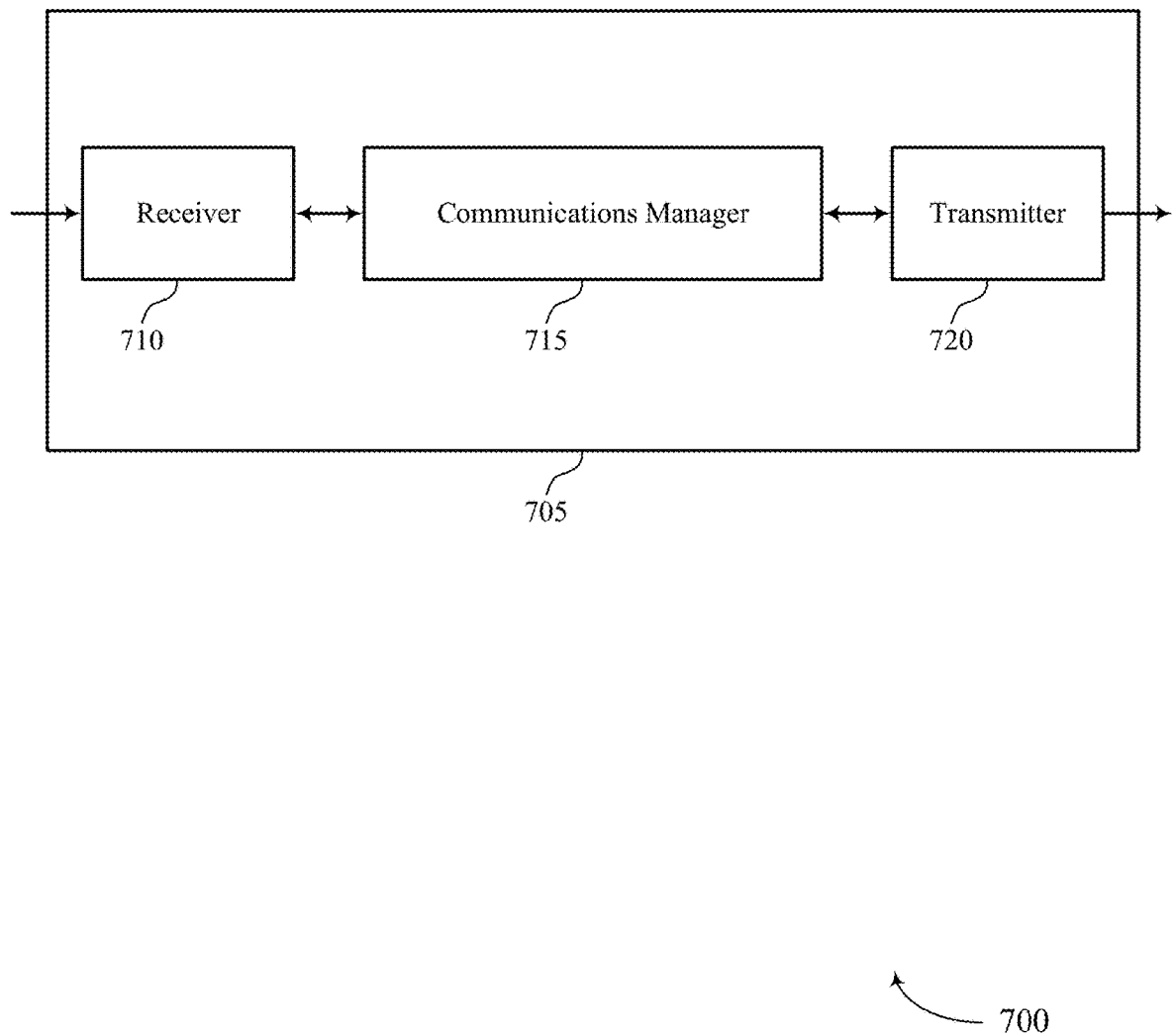
FIGS. 7 and 8 show block diagrams of devices that support bearer mapping on wireless backhaul using cellular radio access technologies, in accordance with one or more aspects of the present disclosure.

FIG. 7 shows a block diagram 700 of a device 705 that supports bearer mapping on wireless backhaul using cellular radio access technologies, in accordance with one or more aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to bearer mapping on wireless backhaul using cellular radio access technologies, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may identify a first channel group including a first radio bearer and a second channel group including a set of second radio bearers, transmit a first packet on the first channel of the first channel group of the backhaul network, the first packet including a mapping indicator set to a first value and a first identifier associated with the first channel of the first channel group, and transmit a second packet on the first channel of the second channel group of the backhaul network, the second packet including the mapping indicator set to a second value different from the first value and a second identifier associated with the first channel of the second channel group. The communications manager 715 may also receive a packet associated with a channel group from a set of available channel groups, the set of available channel groups including a first channel group that includes a first radio bearer and a second channel group that includes a set of second radio bearers, determine, based on a mapping indicator indicated in the packet, whether the packet belongs to the first channel group or the second channel group, and identify, based on the determined channel group and an identifier indicated in the packet, a radio link channel entity associated with the packet. The communications manager 715 may be an example of aspects of the communications manager 1010 or 1110 as described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
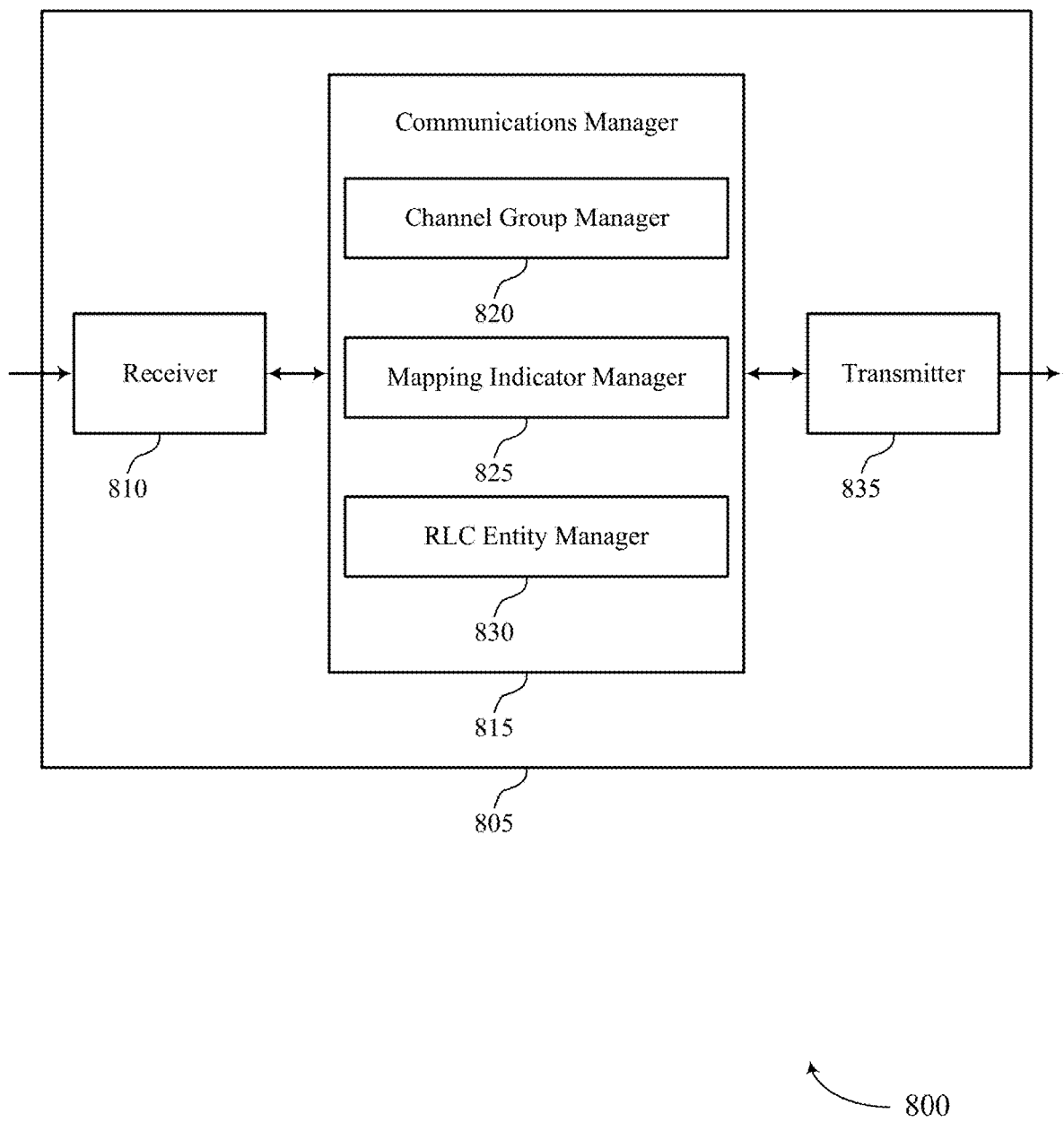

FIG. 8 shows a block diagram 800 of a device 805 that supports bearer mapping on wireless backhaul using cellular radio access technologies, in accordance with one or more aspects of the present disclosure. The device 805 may be an example of aspects of a device 705, a UE 115, or a base station 105 as described herein. The device 805 may include a receiver 810, a communications manager 815, and a transmitter 835. The device 805 may also include a processor. Each of these components may be in communication with one another (e.g., via one or more buses).

Receiver 810 may receive information such as packets, user data, or control information associated with various information channels (e.g., control channels, data channels, and information related to bearer mapping on wireless backhaul using cellular radio access technologies, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a channel group manager 820, a mapping indicator manager 825, and a RLC entity manager 830. The communications manager 815 may be an example of aspects of the communications manager 1010 or 1110 as described herein.

The channel group manager 820 may identify a first channel group including a first radio bearer and a second channel group including a set of second radio bearers, transmit a first packet on the first channel of the first channel group of the backhaul network, the first packet including a mapping indicator set to a first value and a first identifier associated with the first channel of the first channel group, and transmit a second packet on the first channel of the second channel group of the backhaul network, the second packet including the mapping indicator set to a second value different from the first value and a second identifier associated with the first channel of the second channel group. In some examples, the first channel group further including a 1:1 mapping between the first radio bearer and a first channel of a backhaul network and the second channel group including a M:1 mapping between the set of second radio bearers and a second channel of the backhaul network.

The channel group manager 820 may receive a packet associated with a channel group from a set of available channel groups, the set of available channel groups including a first channel group that includes a first radio bearer and a second channel group that includes a set of second radio bearers, the first channel group including a 1:1 mapping between the first radio bearer and a first channel of a backhaul network and the second channel group including a M:1 mapping between the set of second radio bearers and a second channel of the backhaul network.

The mapping indicator manager 825 may determine, based on a mapping indicator indicated in the packet, whether the packet belongs to the first channel group or the second channel group.

The RLC entity manager 830 may identify, based on the determined channel group and an identifier indicated in the packet, a radio link channel entity associated with the packet.

Transmitter 835 may transmit signals generated by other components of the device 805. In some examples, the transmitter 835 may be collocated with a receiver 810 in a transceiver module. For example, the transmitter 835 may be an example of aspects of the transceiver 1020 or 1120 as described with reference to FIGS. 10 and 11. The transmitter 835 may utilize a single antenna or a set of antennas.

Figure 9:
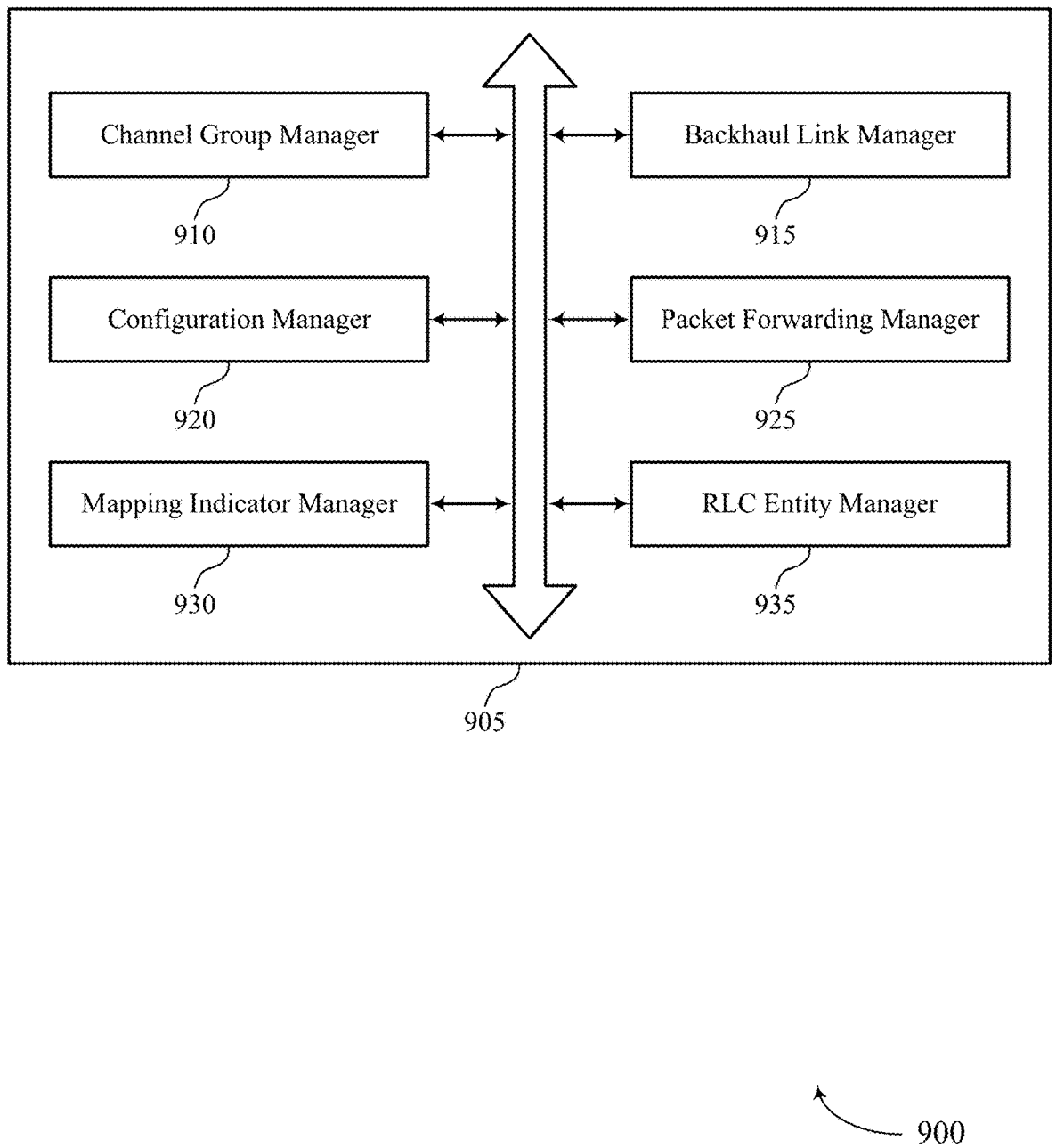
FIG. 9 shows a block diagram of a communications manager that supports bearer mapping on wireless backhaul using cellular radio access technologies, in accordance with one or more aspects of the present disclosure.

FIG. 9 shows a block diagram 900 of a communications manager 905 that supports bearer mapping on wireless backhaul using cellular radio access technologies, in accordance with one or more aspects of the present disclosure. The communications manager 905 may be an example of aspects of a communications manager 715, a communications manager 815, or a communications manager 1010 described herein. The communications manager 905 may include a channel group manager 910, a backhaul link manager 915, a configuration manager 920, a packet forwarding manager 925, a mapping indicator manager 930, and a RLC entity manager 935. Each of these modules may communicate, directly or indirectly, with one another (e.g., via one or more buses).

The channel group manager 910 may identify a first channel group including a first radio bearer and a second channel group including a set of second radio bearers. In some examples, the first channel group further including a 1:1 mapping between the first radio bearer and a first channel of a backhaul network and the second channel group including a M:1 mapping between the set of second radio bearers and a second channel of the backhaul network.

In some examples, the channel group manager 910 may transmit a first packet on the first channel of the first channel group of the backhaul network, the first packet including a mapping indicator set to a first value and a first identifier associated with the first channel of the first channel group.

In some examples, the channel group manager 910 may transmit a second packet on the first channel of the second channel group of the backhaul network, the second packet including the mapping indicator set to a second value different from the first value and a second identifier associated with the first channel of the second channel group.

In some examples, receiving a packet associated with a channel group from a set of available channel groups, the set of available channel groups including a first channel group that includes a first radio bearer and a second channel group that includes a set of second radio bearers, the first channel group including a 1:1 mapping between the first radio bearer and a first channel of a backhaul network and the second channel group including a M:1 mapping between the set of second radio bearers and a second channel of the backhaul network. In some cases, a control bit, or a logical channel identifier, or a combination thereof.

In some cases, the first identifier includes a user equipment radio bearer identifier and the second identifier includes a logical channel identifier. In some cases, the mapping indicator, the first identifier, the second identifier, or a combination thereof, are indicated in a packet header of the corresponding packet.

In some cases, a MAC sub-header, a MAC sub-header extension, an extension header, a RLC header, an adaption layer header, a General-Packet-Radio-Service-Tunneling-Protocol header, or a combination thereof. In some cases, a control bit, or a logical channel identifier, or a combination thereof. In some cases, the identifier includes a user equipment radio bearer identifier and the second identifier includes a logical channel identifier. In some cases, the mapping indicator, the identifier, or a combination thereof, are indicated in a packet header of the packet. In some cases, a MAC sub-header, a MAC sub-header extension, an extension header, a RLC header, an adaption layer header, a General-Packet-Radio-Service-Tunneling-Protocol header, or a combination thereof.

The mapping indicator manager 930 may determine, based on a mapping indicator indicated in the packet, whether the packet belongs to the first channel group or the second channel group.

The RLC entity manager 935 may identify, based on the determined channel group and an identifier indicated in the packet, a radio link channel entity associated with the packet.

The backhaul link manager 915 may select a first link of the backhaul network for transmitting the first packet based on a first radio bearer identifier associated with the first packet.

In some examples, the backhaul link manager 915 may select said first link of the backhaul network for transmitting the second packet based on a destination address associated with the second packet.

In some examples, the backhaul link manager 915 may based on the channel group selecting a link of the backhaul network for transmitting the packet based on a UE bearer identifier or a destination address associated with the first packet.

The configuration manager 920 may receive a signal configuring a channel group, the signal indicating whether the channel group is the first channel group or the second channel group and including a channel group identifier for the channel group.

In some examples, the configuration manager 920 may receive a signal configuring a channel group, the signal indicating whether the channel group is the first channel group or the second channel group and including a channel identifier.

In some cases, the signal configures the first radio bearer to be part of the first channel group and configures the set of second radio bearers to be part of the second channel group.

The packet forwarding manager 925 may receive a third packet including the mapping indicator, a third identifier, a radio bearer identifier and a destination address.

In some examples, the packet forwarding manager 925 may determine, based on the mapping indicator, whether the third packet belongs to the first channel group or the second channel group.

In some examples, the packet forwarding manager 925 may select a backhaul link for transmission based on whether the third identifier of the third packet belongs to the first channel group or the destination address of the third packet belongs to the second channel group.

In some examples, the packet forwarding manager 925 may select a channel for transmission on the selected backhaul link based on the third identifier.

In some examples, the packet forwarding manager 925 may receive a second packet including the mapping indicator, a second identifier, and a destination address of the second packet.

In some examples, the packet forwarding manager 925 may determine, based on the mapping indicator, whether the second packet belongs to the first channel group or the second channel group.

In some examples, the packet forwarding manager 925 may forward the second packet based on the determined channel group, the second identifier, and the destination address of the second packet.

Figure 10:
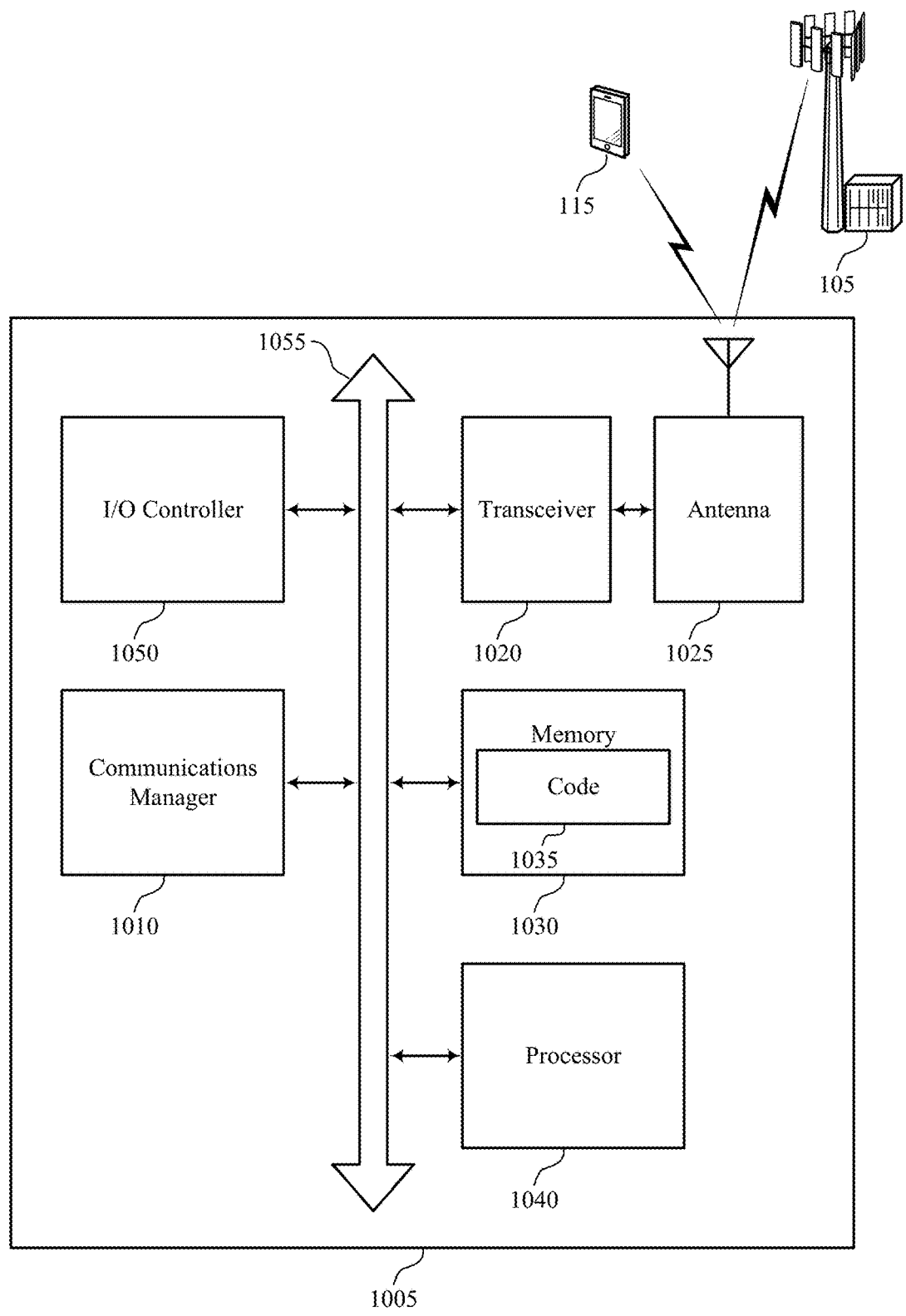
FIG. 10 shows a diagram of a system including a user equipment (UE) that supports bearer mapping on wireless backhaul using cellular radio access technologies, in accordance with one or more aspects of the present disclosure.

FIG. 10 shows a diagram of a system 1000 including a device 1005 that supports bearer mapping on wireless backhaul using cellular radio access technologies, in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may identify a first channel group including a first radio bearer and a second channel group including a set of second radio bearers, transmit a first packet on the first channel of the first channel group of the backhaul network, the first packet including a mapping indicator set to a first value and a first identifier associated with the first channel of the first channel group, and transmit a second packet on the first channel of the second channel group of the backhaul network, the second packet including the mapping indicator set to a second value different from the first value and a second identifier associated with the first channel of the second channel group. The communications manager 1010 may also receive a packet associated with a channel group from a set of available channel groups, the set of available channel groups including a first channel group that includes a first radio bearer and a second channel group that includes a set of second radio bearers, determine, based on a mapping indicator indicated in the packet, whether the packet belongs to the first channel group or the second channel group, and identify, based on the determined channel group and an identifier indicated in the packet, a radio link channel entity associated with the packet.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM), read only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting bearer mapping on wireless backhaul using cellular radio access technologies).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may be indirectly executable by the processor 1040 but may cause a computer (e.g., when compiled and executed) to perform functions described herein.

Figure 11:
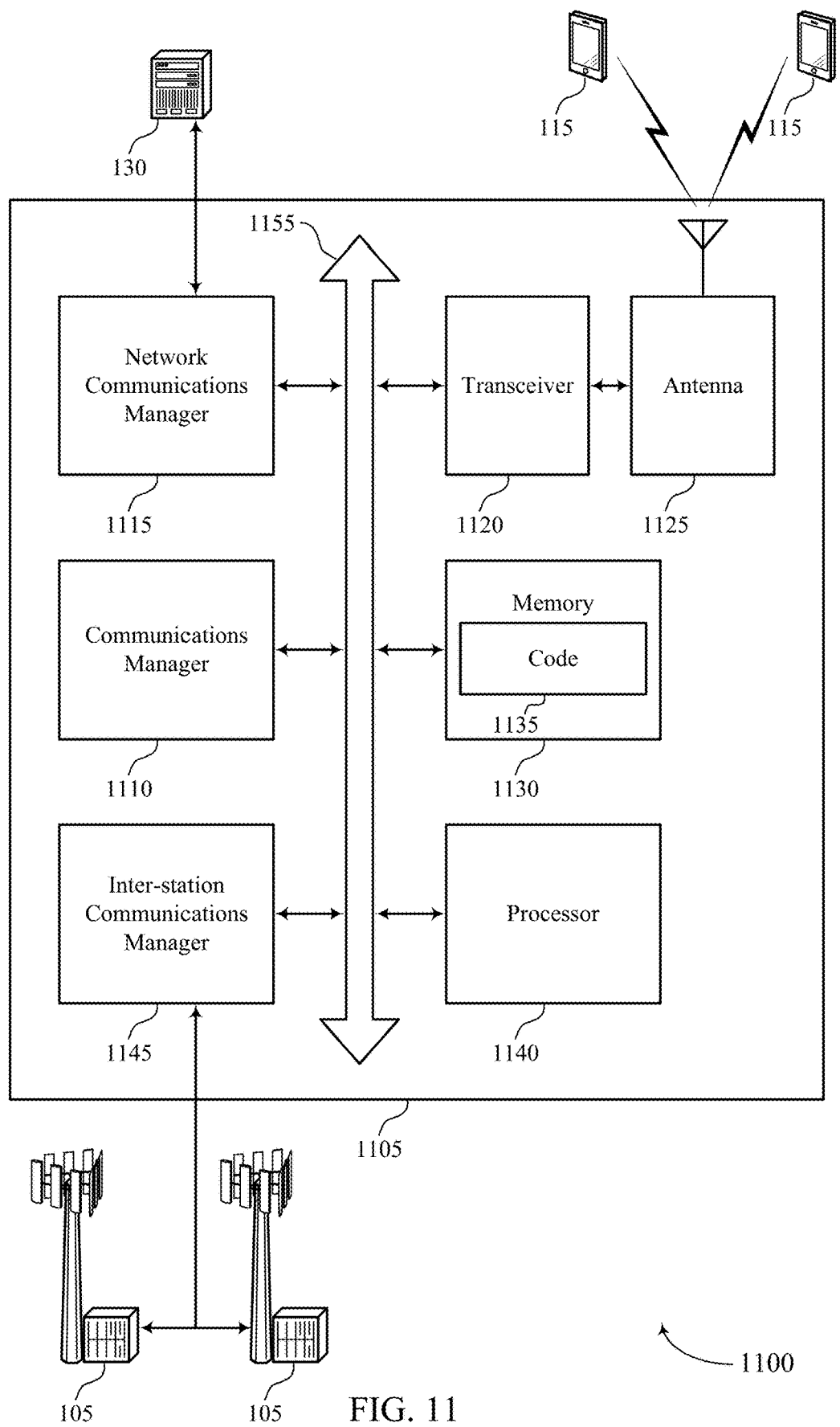
FIG. 11 shows a diagram of a system including a base station that supports bearer mapping on wireless backhaul using cellular radio access technologies, in accordance with one or more aspects of the present disclosure.

FIG. 11 shows a diagram of a system 1100 including a device 1105 that supports bearer mapping on wireless backhaul using cellular radio access technologies, in accordance with one or more aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may identify a first channel group including a first radio bearer and a second channel group including a set of second radio bearers, transmit a first packet on the first channel of the first channel group of the backhaul network, the first packet including a mapping indicator set to a first value and a first identifier associated with the first channel of the first channel group, and transmit a second packet on the first channel of the second channel group of the backhaul network, the second packet including the mapping indicator set to a second value different from the first value and a second identifier associated with the first channel of the second channel group. The communications manager 1110 may also receive a packet associated with a channel group from a set of available channel groups, the set of available channel groups including a first channel group that includes a first radio bearer and a second channel group that includes a set of second radio bearers, determine, based on a mapping indicator indicated in the packet, whether the packet belongs to the first channel group or the second channel group, and identify, based on the determined channel group and an identifier indicated in the packet, a radio link channel entity associated with the packet.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting bearer mapping on wireless backhaul using cellular radio access technologies).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may be indirectly executable by the processor 1140 but may cause a computer (e.g., when compiled and executed) to perform functions described herein.

Figure 12:
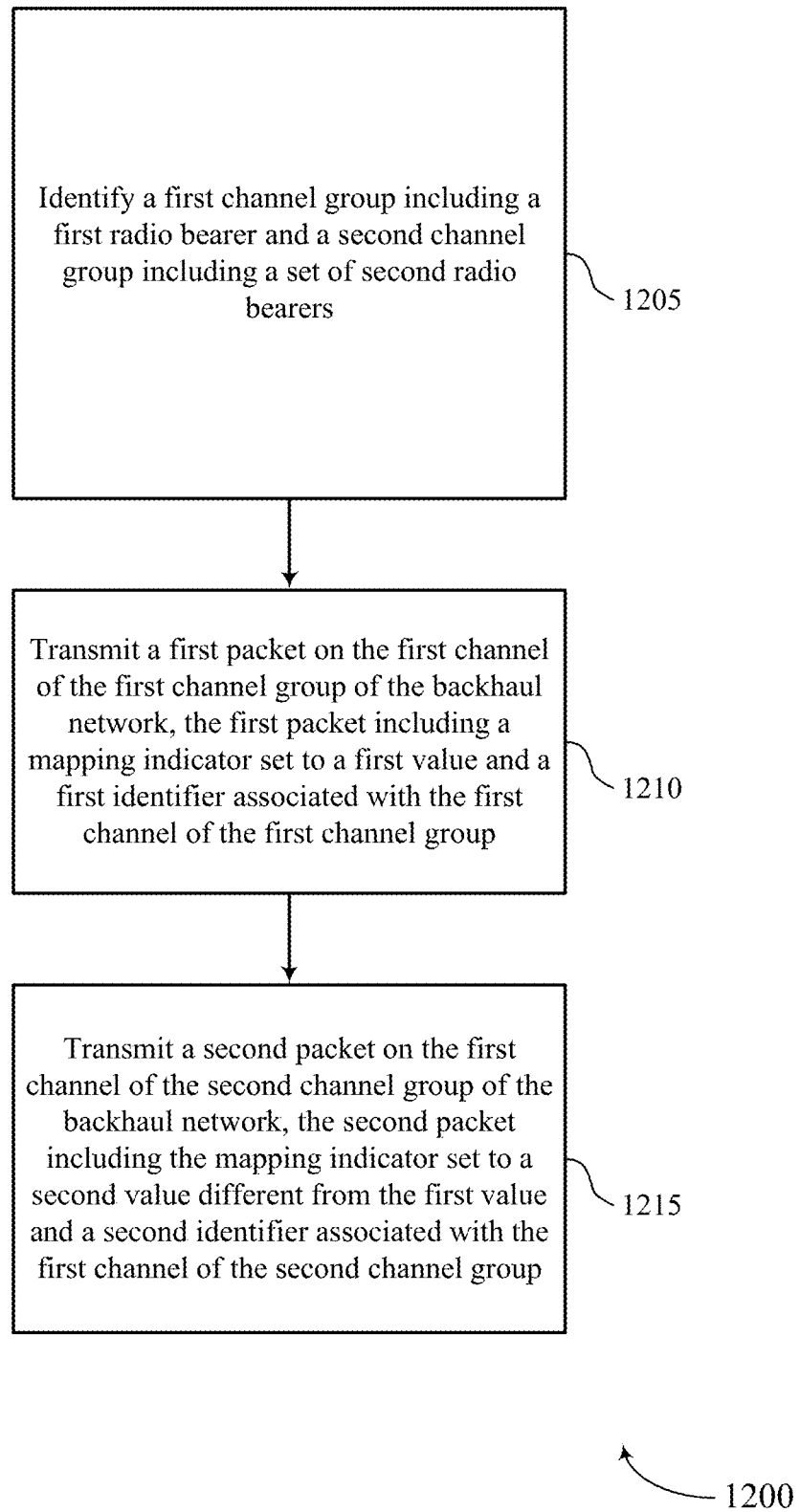
FIGS. 12 through 14 show flowcharts illustrating methods that support bearer mapping on wireless backhaul using cellular radio access technologies, in accordance with one or more aspects of the present disclosure.

FIG. 12 shows a flowchart illustrating a method 1200 that supports bearer mapping on wireless backhaul using cellular radio access technologies, in accordance with one or more aspects of the present disclosure. The operations of method 1200 may be implemented by a UE 115 or base station 105 or its components as described herein. For example, the operations of method 1200 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may identify a first channel group including a first radio bearer and a second channel group including a set of second radio bearers. The operations of 1205 may be performed according to the methods described herein. In some examples, aspects of the operations of 1205 may be performed by a channel group manager as described with reference to FIGS. 7 through 11.

At 1210, the UE or base station may transmit a first packet on the first channel of the first channel group of the backhaul network, the first packet including a mapping indicator set to a first value and a first identifier associated with the first channel of the first channel group. The operations of 1210 may be performed according to the methods described herein. In some examples, aspects of the operations of 1210 may be performed by a channel group manager as described with reference to FIGS. 7 through 11.

At 1215, the UE or base station may transmit a second packet on the first channel of the second channel group of the backhaul network, the second packet including the mapping indicator set to a second value different from the first value and a second identifier associated with the first channel of the second channel group. The operations of 1215 may be performed according to the methods described herein. In some examples, aspects of the operations of 1215 may be performed by a channel group manager as described with reference to FIGS. 7 through 11.

Figure 13:
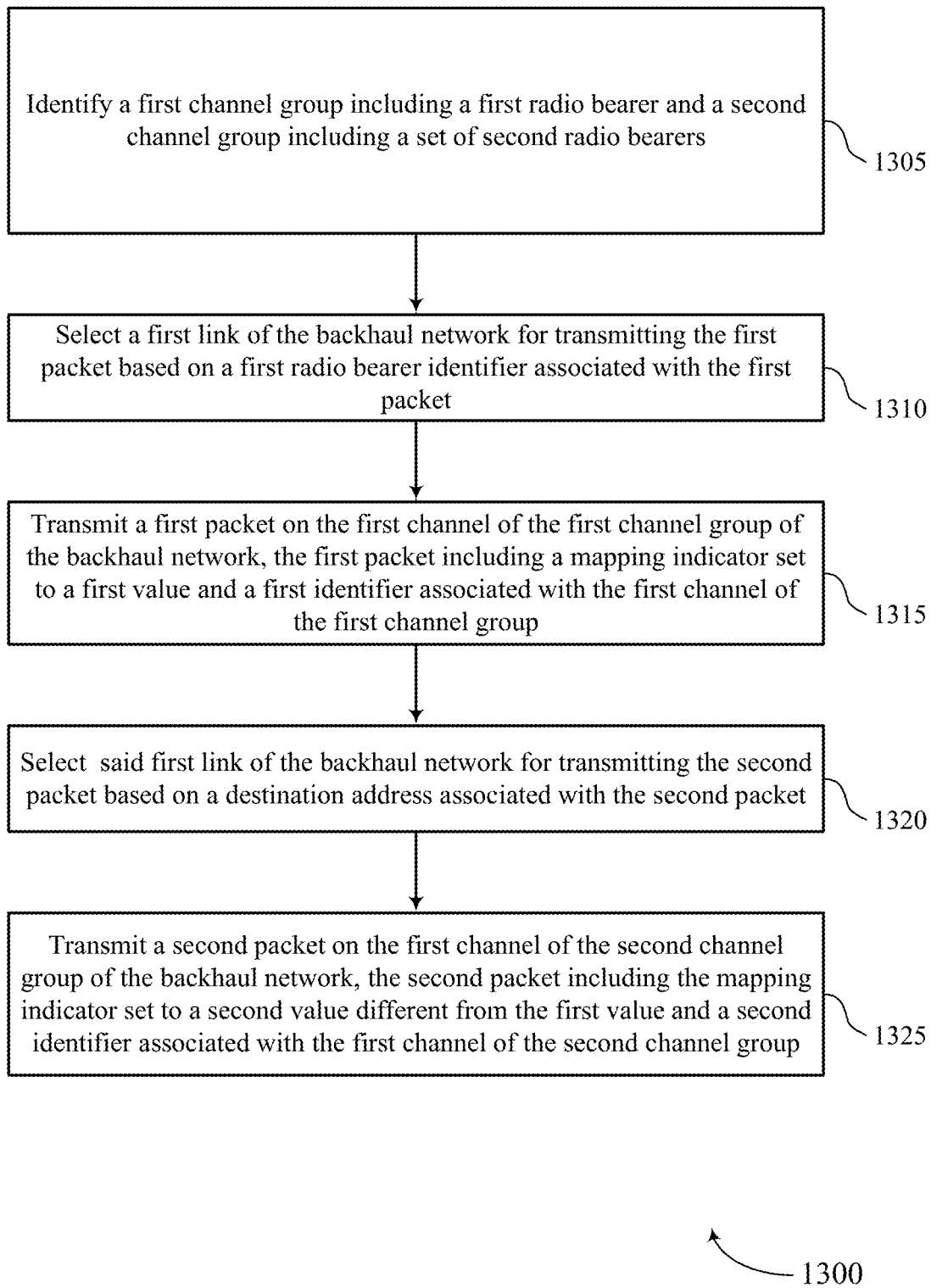

FIG. 13 shows a flowchart illustrating a method 1300 that supports bearer mapping on wireless backhaul using cellular radio access technologies, in accordance with one or more aspects of the present disclosure. The operations of method 1300 may be implemented by a UE 115 or base station 105 or its components as described herein. For example, the operations of method 1300 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may identify a first channel group including a first radio bearer and a second channel group including a set of second radio bearers. The operations of 1305 may be performed according to the methods described herein. In some examples, aspects of the operations of 1305 may be performed by a channel group manager as described with reference to FIGS. 7 through 11.

At 1310, the UE or base station may select a first link of the backhaul network for transmitting the first packet based on a first radio bearer identifier associated with the first packet. The operations of 1310 may be performed according to the methods described herein. In some examples, aspects of the operations of 1310 may be performed by a backhaul link manager as described with reference to FIGS. 7 through 11.

At 1315, the UE or base station may transmit a first packet on the first channel of the first channel group of the backhaul network, the first packet including a mapping indicator set to a first value and a first identifier associated with the first channel of the first channel group. The operations of 1315 may be performed according to the methods described herein. In some examples, aspects of the operations of 1315 may be performed by a channel group manager as described with reference to FIGS. 7 through 11.

At 1320, the UE or base station may select said first link of the backhaul network for transmitting the second packet based on a destination address associated with the second packet. The operations of 1320 may be performed according to the methods described herein. In some examples, aspects of the operations of 1320 may be performed by a backhaul link manager as described with reference to FIGS. 7 through 11.

At 1325, the UE or base station may transmit a second packet on the first channel of the second channel group of the backhaul network, the second packet including the mapping indicator set to a second value different from the first value and a second identifier associated with the first channel of the second channel group. The operations of 1325 may be performed according to the methods described herein. In some examples, aspects of the operations of 1325 may be performed by a channel group manager as described with reference to FIGS. 7 through 11.

Figure 14:
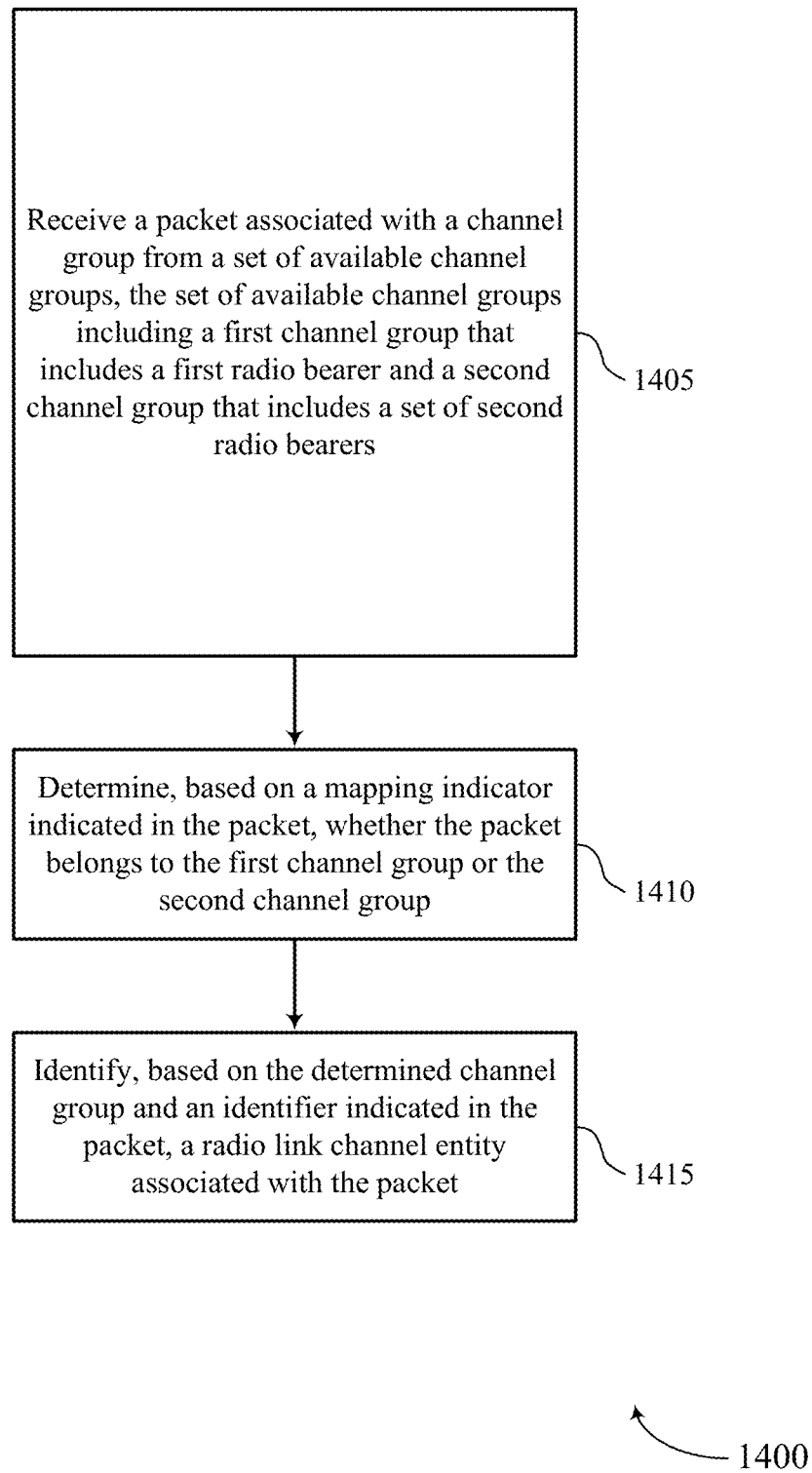

FIG. 14 shows a flowchart illustrating a method 1400 that supports bearer mapping on wireless backhaul using cellular radio access technologies, in accordance with one or more aspects of the present disclosure. The operations of method 1400 may be implemented by a UE 115 or base station 105 or its components as described herein. For example, the operations of method 1400 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may receive a packet associated with a channel group from a set of available channel groups, the set of available channel groups including a first channel group that includes a first radio bearer and a second channel group that includes a set of second radio bearers. The operations of 1405 may be performed according to the methods described herein. In some examples, aspects of the operations of 1405 may be performed by a channel group manager as described with reference to FIGS. 7 through 11.

At 1410, the UE or base station may determine, based on a mapping indicator indicated in the packet, whether the packet belongs to the first channel group or the second channel group. The operations of 1410 may be performed according to the methods described herein. In some examples, aspects of the operations of 1410 may be performed by a mapping indicator manager as described with reference to FIGS. 7 through 11.

At 1415, the UE or base station may identify, based on the determined channel group and an identifier indicated in the packet, a radio link channel entity associated with the packet. The operations of 1415 may be performed according to the methods described herein. In some examples, aspects of the operations of 1415 may be performed by a RLC entity manager as described with reference to FIGS. 7 through 11.

It should be noted that the methods described herein describe possible implementations, and that the operations may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a device, comprising:
    identifying a first channel group comprising a first radio bearer and a second channel group comprising a set of a plurality of second radio bearers;
    transmitting a first packet on a first channel of the first channel group of a backhaul network, the first packet comprising a mapping indicator set to a first value and a first identifier associated with the first channel of the first channel group; and transmitting a second packet on the first channel of the second channel group of the backhaul network, the second packet comprising the mapping indicator set to a second value different from the first value and a second identifier associated with the first channel of the second channel group.

2. The method of claim 1, wherein the first channel group further comprises a one-to-one mapping between the first radio bearer and the first channel of the backhaul network and the second channel group comprising a many-to-one mapping between the set of the plurality of second radio bearers and a second channel of the backhaul network.

3. The method of claim 1, further comprising:
selecting a first link of the backhaul network for transmitting the first packet based at least in part on a first radio bearer identifier associated with the first packet; and
selecting said first link of the backhaul network for transmitting the second packet based at least in part on a destination address associated with the second packet.

4. The method of claim 1, further comprising:
receiving a signal configuring a channel group, the signal indicating whether the channel group is the first channel group or the second channel group and comprising a channel group identifier for the channel group.

5. The method of claim 4, wherein the signal configures the first radio bearer to be part of the first channel group and configures the set of the plurality of second radio bearers to be part of the second channel group.

6. The method of claim 1, further comprising:
receiving a third packet comprising the mapping indicator, a third identifier, a radio bearer identifier and a destination address;
determining, based at least in part on the mapping indicator, whether the third packet belongs to the first channel group or the second channel group;
selecting a backhaul link for transmission based at least in part on whether the third identifier of the third packet belongs to the first channel group or the destination address of the third packet belongs to the second channel group; and
selecting a channel for transmission on the selected backhaul link based on the third identifier.

7. The method of claim 1, wherein the mapping indicator comprises at least one of: a control bit, or a logical channel identifier, or a combination thereof.

8. The method of claim 1, wherein the first identifier comprises a user equipment radio bearer identifier and the second identifier comprises a logical channel identifier.

9. The method of claim 1, wherein the mapping indicator, the first identifier, the second identifier, or a combination thereof, are indicated in a packet header of the corresponding packet.

10. The method of claim 9, wherein the packet header comprises at least one of: a medium access control (MAC) sub-header, a MAC sub-header extension, an extension header, a radio link control (RLC) header, an adaption layer header, a General-Packet-Radio-Service-Tunneling-Protocol header, or a combination thereof.

11. The method of claim 1, wherein the mapping indicator and the first identifier are in a same field of the first packet.

12. A method for wireless communications at a device, comprising:
receiving a packet associated with a channel group from a set of available channel groups, the set of available channel groups comprising a first channel group that comprises a first radio bearer and a second channel group that comprises a set of a plurality of second radio bearers;
determining, based at least in part on a mapping indicator indicated in the packet, whether the packet belongs to the first channel group or the second channel group; and
identifying, based at least in part on the determined channel group and an identifier indicated in the packet, a radio link channel entity associated with the packet.

13. The method of claim 12, wherein the first channel group comprises a one-to-one mapping between the first radio bearer and a first channel of a backhaul network and the second channel group comprising a many-to-one mapping between the set of the plurality of second radio bearers and a second channel of the backhaul network.

14. The method of claim 12, further comprising:
selecting, based on the determined channel group, a link of a backhaul network for transmitting the packet based at least in part on a user equipment (UE) bearer identifier or a destination address associated with the packet.

15. The method of claim 12, further comprising:
receiving a signal configuring a channel group, the signal indicating whether the channel group is the first channel group or the second channel group and comprising a channel identifier.

16. The method of claim 12, further comprising:
receiving a second packet comprising the mapping indicator, a second identifier, and a destination address of the second packet;
determining, based at least in part on the mapping indicator, whether the second packet belongs to the first channel group or the second channel group; and
forwarding the second packet based on the determined channel group, the second identifier, and the destination address of the second packet.

17. The method of claim 12, wherein the mapping indicator comprises at least one of: a control bit, or a logical channel identifier, or a combination thereof.

18. The method of claim 12, wherein the identifier comprises a user equipment radio bearer identifier and a second identifier comprises a logical channel identifier.

19. The method of claim 12, wherein the mapping indicator, the identifier, or a combination thereof, are indicated in a packet header of the packet.

20. The method of claim 19, wherein the packet header comprises at least one of: a medium access control (MAC) sub-header, a MAC sub-header extension, an extension header, a radio link control (RLC) header, an adaption layer header, a General-Packet-Radio-Service-Tunneling-Protocol header, or a combination thereof.

21. An apparatus for wireless communications at a device, comprising:
a processor; and
memory coupled with the processor, the processor and memory configured to:
identify a first channel group comprising a first radio bearer and a second channel group comprising a set of a plurality of second radio bearers;
transmit a first packet on a first channel of the first channel group of a backhaul network, the first packet comprising a mapping indicator set to a first value and a first identifier associated with the first channel of the first channel group; and
transmit a second packet on the first channel of the second channel group of the backhaul network, the second packet comprising the mapping indicator set to a second value different from the first value and a second identifier associated with the first channel of the second channel group.

22. The apparatus of claim 21, wherein:
the first channel group further comprises a one-to-one mapping between the first radio bearer and the first channel of the backhaul network and the second channel group comprising a many-to-one mapping between the set of the plurality of second radio bearers and a second channel of the backhaul network.

23. The apparatus of claim 21, wherein the processor and memory are further configured to:
select a first link of the backhaul network for transmitting the first packet based at least in part on a first radio bearer identifier associated with the first packet; and
select said first link of the backhaul network for transmitting the second packet based at least in part on a destination address associated with the second packet.

24. The apparatus of claim 21, wherein the processor and memory are further configured to:
receive a signal configuring a channel group, the signal indicating whether the channel group is the first channel group or the second channel group and comprising a channel group identifier for the channel group.

25. The apparatus of claim 24, wherein the signal configures the first radio bearer to be part of the first channel group and configures the set of the plurality of second radio bearers to be part of the second channel group.

26. The apparatus of claim 21, wherein the processor and memory are further configured to:
receive a third packet comprising the mapping indicator, a third identifier, a radio bearer identifier and a destination address;
determine, based at least in part on the mapping indicator, whether the third packet belongs to the first channel group or the second channel group;
select a backhaul link for transmission based at least in part on whether the third identifier of the third packet belongs to the first channel group or the destination address of the third packet belongs to the second channel group; and
select a channel for transmission on the selected backhaul link based on the third identifier.

27. The apparatus of claim 21, wherein the mapping indicator and the first identifier are in a same field of the first packet.

28. An apparatus for wireless communications at a device, comprising:
a processor; and
memory coupled with the processor, the processor and memory configured to:
receive a packet associated with a channel group from a set of available channel groups, the set of available channel groups comprising a first channel group that comprises a first radio bearer and a second channel group that comprises a set of a plurality of second radio bearers;
determine, based at least in part on a mapping indicator indicated in the packet, whether the packet belongs to the first channel group or the second channel group; and
identify, based at least in part on the determined channel group and an identifier indicated in the packet, a radio link channel entity associated with the packet.

29. The apparatus of claim 28, wherein the first channel group comprises a one-to-one mapping between the first radio bearer and a first channel of a backhaul network and the second channel group comprising a many-to-one mapping between the set of the plurality of second radio bearers and a second channel of the backhaul network.

30. The apparatus of claim 28, wherein the processor and memory are further configured to:
select, based on the channel group, a link of a backhaul network for transmitting the packet based at least in part on a user equipment (UE) bearer identifier or a destination address associated with the packet.

31. The apparatus of claim 28, wherein the processor and memory are further configured to:
receive a signal configuring a channel group, the signal indicating whether the channel group is the first channel group or the second channel group and comprising a channel identifier.

32. The apparatus of claim 28, wherein the processor and memory are further configured to:
receive a second packet comprising the mapping indicator, a second identifier, and a destination address of the second packet;
determine, based at least in part on the mapping indicator, whether the second packet belongs to the first channel group or the second channel group; and
forward the second packet based on the determined channel group, the second identifier, and the destination address of the second packet.

33. An apparatus for wireless communications at a device, comprising:
means for identifying a first channel group comprising a first radio bearer and a second channel group comprising a set of a plurality of second radio bearers;
means for transmitting a first packet on a first channel of the first channel group of a backhaul network, the first packet comprising a mapping indicator set to a first value and a first identifier associated with the first channel of the first channel group; and
means for transmitting a second packet on the first channel of the second channel group of the backhaul network, the second packet comprising the mapping indicator set to a second value different from the first value and a second identifier associated with the first channel of the second channel group.

34. The apparatus of claim 33, wherein the first channel group further comprises a one-to-one mapping between the first radio bearer and the first channel of the backhaul network and the second channel group comprising a many-to-one mapping between the set of the plurality of second radio bearers and a second channel of the backhaul network.

35. The apparatus of claim 33, wherein the mapping indicator and the first identifier are in a same field of the first packet.

36. A non-transitory computer-readable medium storing code for wireless communication at a device, the code comprising instructions executable by a processor to:
identify a first channel group comprising a first radio bearer and a second channel group comprising a set of a plurality of second radio bearers;
transmit a first packet on a first channel of the first channel group of a backhaul network, the first packet comprising a mapping indicator set to a first value and a first identifier associated with the first channel of the first channel group; and
transmit a second packet on the first channel of the second channel group of the backhaul network, the second packet comprising the mapping indicator set to a second value different from the first value and a second identifier associated with the first channel of the second channel group.

37. The non-transitory computer-readable medium of claim 36, wherein the first channel group further comprises a one-to-one mapping between the first radio bearer and the first channel of the backhaul network and the second channel group comprising a many-to-one mapping between the set of the plurality of second radio bearers and a second channel of the backhaul network.

38. The non-transitory computer-readable medium of claim 36, wherein the mapping indicator and the first identifier are in a same field of the first packet.

* * * * *